US012521742B2

(12) United States Patent
Fideler

(10) Patent No.: US 12,521,742 B2
(45) Date of Patent: Jan. 13, 2026

(54) FLUID APPLICATOR

(71) Applicant: Wagner Spray Tech Corporation, Plymouth, MN (US)

(72) Inventor: Brian Lee Fideler, Jordan, MN (US)

(73) Assignee: Wagner Spray Tech Corp., Plymouth, MN (US)

( * ) Notice: Subject to any disclaimer, the term of this patent is extended or adjusted under 35 U.S.C. 154(b) by 137 days.

(21) Appl. No.: 18/306,577

(22) Filed: Apr. 25, 2023

(65) Prior Publication Data

US 2023/0256461 A1 Aug. 17, 2023

Related U.S. Application Data

(63) Continuation of application No. 17/182,717, filed on Feb. 23, 2021, now Pat. No. 11,666,932.

(60) Provisional application No. 63/000,516, filed on Mar. 27, 2020.

(51) Int. Cl.
*B05B 9/01* (2006.01)
*B05B 9/04* (2006.01)
*B05B 15/58* (2018.01)

(52) U.S. Cl.
CPC .............. *B05B 9/01* (2013.01); *B05B 9/0403* (2013.01); *B05B 15/58* (2018.02)

(58) Field of Classification Search
CPC ......... B05B 9/01; B05B 15/58; B05B 9/0403; B05B 15/40; B05B 15/65
USPC .................................................. 239/525, 575
See application file for complete search history.

(56) References Cited

U.S. PATENT DOCUMENTS

| | | | |
|---|---|---|---|
| 1,631,167 | A | 6/1927 | Russell |
| 1,698,945 | A | 1/1929 | Vincent |
| 1,849,300 | A | 3/1932 | Jenkins |
| 1,876,644 | A | 9/1932 | Downs |
| 2,497,625 | A | 2/1950 | Norwick |
| 2,567,176 | A | 9/1951 | Ballard |
| 2,969,926 | A | 1/1961 | Peeps |
| 3,016,929 | A | 1/1962 | Rapaport |
| 3,236,459 | A | 2/1966 | Mcritchie |
| 3,282,511 | A | 11/1966 | Barton |
| 3,317,141 | A | 5/1967 | Mann |

(Continued)

FOREIGN PATENT DOCUMENTS

| | | | |
|---|---|---|---|
| CN | 2230188 | Y | 7/1996 |
| CN | 1902002 | A | 1/2007 |

(Continued)

OTHER PUBLICATIONS

Extended European Search Report for European Application No. 21774038.0, dated Mar. 7, 2024, 10 pages.

(Continued)

*Primary Examiner* — Steven J Ganey
(74) *Attorney, Agent, or Firm* — Christopher J. Volkmann; KELLY, HOLT & CHRISTENSON PLLC

(57) ABSTRACT

A fluid applicator configured to receive a pressurized fluid includes a pressure vessel configured to receive the pressurized fluid from a fluid delivery line. The pressure vessel includes a valve chamber configured to receive a valve assembly, a filter chamber configured to receive a filter assembly, and a fluid delivery line fitting configured to be coupled to the fluid delivery line. The fluid applicator further including a tip assembly coupled to the pressure vessel and configured to atomize the pressurized fluid.

23 Claims, 17 Drawing Sheets

(56) References Cited

U.S. PATENT DOCUMENTS

| | | | |
|---|---|---|---|
| 3,396,937 | A | 8/1968 | Mcdougall |
| 3,865,314 | A | 2/1975 | Levey et al. |
| 3,873,023 | A | 3/1975 | Moss et al. |
| 3,888,421 | A | 6/1975 | Chow |
| 3,955,763 | A | 5/1976 | Pyle et al. |
| 3,968,934 | A | 7/1976 | Healy |
| 4,166,579 | A | 9/1979 | Beise et al. |
| 4,219,162 | A | 8/1980 | Dadson |
| 4,448,355 | A | 5/1984 | Roman |
| 4,448,391 | A | 5/1984 | Young |
| 4,501,533 | A | 2/1985 | Bower, Jr. |
| 4,519,545 | A | 5/1985 | Kuminecz et al. |
| 4,534,512 | A | 8/1985 | Chow et al. |
| 4,560,109 | A | 12/1985 | Teruyuki et al. |
| 4,776,517 | A | 10/1988 | Heren |
| 4,784,330 | A | 11/1988 | Hammelmann |
| 4,785,997 | A | 11/1988 | Liska et al. |
| 4,802,313 | A | 2/1989 | Smith |
| 4,817,872 | A | 4/1989 | Mattson |
| 4,834,293 | A | 5/1989 | Lichfield |
| 4,933,569 | A | 6/1990 | Merchlewitz |
| 4,958,769 | A | 9/1990 | Schowiak |
| D313,270 | S | 12/1990 | Lin |
| D314,421 | S | 2/1991 | Tajima et al. |
| 5,031,657 | A | 7/1991 | Stairs |
| 5,064,119 | A | 11/1991 | Mellette |
| 5,090,623 | A | 2/1992 | Burns et al. |
| 5,119,992 | A | 6/1992 | Grime |
| 5,141,161 | A | 8/1992 | Anderson et al. |
| 5,218,993 | A | 6/1993 | Steinberg et al. |
| 5,284,301 | A | 2/1994 | Kieffer |
| 5,332,159 | A | 7/1994 | Grime et al. |
| 5,370,314 | A | 12/1994 | Gebauer et al. |
| 5,392,992 | A | 2/1995 | Farnsteiner et al. |
| 5,549,246 | A | 8/1996 | Kukesh |
| 5,609,302 | A | 3/1997 | Smith |
| 5,662,273 | A | 9/1997 | Chih |
| 5,732,886 | A | 3/1998 | Liaw |
| 5,740,968 | A | 4/1998 | Mueller |
| 5,836,517 | A | 11/1998 | Burns et al. |
| 5,873,530 | A | 2/1999 | Chizinsky |
| 6,019,294 | A | 2/2000 | Anderson et al. |
| 6,032,922 | A | 3/2000 | Shew |
| 6,173,910 | B1 | 1/2001 | Yean |
| 6,176,437 | B1 | 1/2001 | Pedersen |
| 6,260,774 | B1 | 7/2001 | Erickson |
| 6,279,839 | B1 | 8/2001 | Chang |
| 6,450,422 | B1 | 9/2002 | Maggio |
| 6,460,787 | B1 | 10/2002 | Hartle et al. |
| 6,561,441 | B1 | 5/2003 | Hsieh |
| 6,641,061 | B1 | 11/2003 | Hsieh |
| 6,708,900 | B1 | 3/2004 | Zhu et al. |
| 6,860,438 | B1 | 3/2005 | Huang |
| 6,880,803 | B2 | 4/2005 | Kassulat et al. |
| 7,216,816 | B2 | 5/2007 | Hammarth et al. |
| D552,715 | S | 10/2007 | Schmon et al. |
| 7,296,780 | B1 | 11/2007 | Hung |
| D563,505 | S | 3/2008 | Schmon et al. |
| 7,360,720 | B2 | 4/2008 | Gohring et al. |
| D570,448 | S | 6/2008 | Wang |
| 7,389,945 | B2 | 6/2008 | Huang |
| D574,928 | S | 8/2008 | Huang |
| D581,483 | S | 11/2008 | Bass et al. |
| 7,527,239 | B2 | 5/2009 | Mau et al. |
| D604,393 | S | 11/2009 | Johnson et al. |
| D604,394 | S | 11/2009 | Wang |
| 7,694,893 | B2 | 4/2010 | Zittel et al. |
| D616,527 | S | 5/2010 | Anderson et al. |
| 7,789,327 | B2 | 9/2010 | Micheli et al. |
| 7,866,573 | B2 | 1/2011 | Stenborg |
| 7,922,107 | B2 | 4/2011 | Fox |
| 7,959,191 | B2 | 6/2011 | Schouten |
| 7,971,806 | B2 | 7/2011 | Johnson et al. |
| 8,308,083 | B2 | 11/2012 | Woodgate et al. |
| 8,308,086 | B2 | 11/2012 | Micheli et al. |

| | | | |
|---|---|---|---|
| 8,312,896 | B2 | 11/2012 | Baltz |
| 8,490,896 | B2 | 7/2013 | Chen |
| 8,684,281 | B2 | 4/2014 | Micheli et al. |
| 8,690,083 | B2 | 4/2014 | Drozd et al. |
| 8,870,097 | B2 | 10/2014 | Micheli et al. |
| 8,893,930 | B2 | 11/2014 | Tix et al. |
| 8,950,693 | B2 | 2/2015 | Hsieh |
| 9,010,658 | B2 | 4/2015 | Johnson et al. |
| 9,192,950 | B2 | 11/2015 | Carleton et al. |
| 9,604,234 | B2 | 3/2017 | Thompson et al. |
| 9,802,211 | B2 | 10/2017 | Joseph et al. |
| 9,968,954 | B2 | 5/2018 | Becker et al. |
| 10,940,498 | B2 | 3/2021 | Fideler |
| 2002/0038826 | A1 | 4/2002 | Hurray et al. |
| 2003/0006322 | A1 | 1/2003 | Hartle et al. |
| 2003/0071144 | A1 | 4/2003 | Naemura |
| 2004/0089742 | A1 | 5/2004 | Antonucci |
| 2005/0098691 | A1 | 5/2005 | Yorns et al. |
| 2005/0145723 | A1 | 7/2005 | Blette et al. |
| 2005/0189445 | A1 | 9/2005 | Hartle et al. |
| 2006/0065760 | A1 | 3/2006 | Micheli |
| 2007/0057092 | A1 | 3/2007 | Huang |
| 2007/0080243 | A1 | 4/2007 | Alexander |
| 2007/0205305 | A1 | 9/2007 | Vagedes |
| 2008/0017734 | A1 | 1/2008 | Micheli et al. |
| 2008/0265057 | A1 | 10/2008 | Martin |
| 2008/0296409 | A1 | 12/2008 | Micheli |
| 2009/0008481 | A1 | 1/2009 | Smith et al. |
| 2009/0050716 | A1 | 2/2009 | Binder et al. |
| 2009/0277976 | A1 | 11/2009 | Micheli et al. |
| 2009/0302133 | A1 | 12/2009 | Micheli et al. |
| 2010/0008804 | A1 | 1/2010 | Liska |
| 2011/0072956 | A1 | 3/2011 | Wall |
| 2012/0325934 | A1 | 12/2012 | Delorme et al. |
| 2014/0054399 | A1 | 2/2014 | Hsieh |
| 2014/0299678 | A1 | 10/2014 | Kosaka |
| 2015/0014445 | A1 | 1/2015 | Kinoshita et al. |
| 2015/0231655 | A1* | 8/2015 | Adams .................... B05B 9/01 239/526 |
| 2016/0375453 | A1 | 12/2016 | Tullney et al. |
| 2017/0227306 | A1 | 8/2017 | Burfeind |
| 2018/0047562 | A1 | 2/2018 | Devilliers et al. |
| 2018/0111142 | A1 | 4/2018 | Joaquim et al. |
| 2019/0076857 | A1 | 3/2019 | Fideler |
| 2019/0076865 | A1 | 3/2019 | Fideler |
| 2020/0156095 | A1* | 5/2020 | Johnston .................. B05B 9/01 |
| 2021/0197220 | A1 | 7/2021 | Shultz et al. |
| 2021/0299687 | A1 | 9/2021 | Fideler |
| 2021/0370328 | A1 | 12/2021 | Fideler |

FOREIGN PATENT DOCUMENTS

| | | | |
|---|---|---|---|
| CN | 1902004 | A | 1/2007 |
| CN | 101125316 | A | 2/2008 |
| CN | 101300081 | A | 11/2008 |
| CN | 201543532 | U | 8/2010 |
| CN | 201815423 | U | 5/2011 |
| CN | 202909866 | U | 5/2013 |
| CN | 203227581 | U | 10/2013 |
| CN | 203757149 | U | 8/2014 |
| CN | 211801762 | U | 10/2020 |
| DE | 102006019364 | A1 | 10/2007 |
| EP | 1679125 | A1 | 7/2006 |
| EP | 3060355 | A1 | 8/2016 |
| EP | 3060355 | B1 | 3/2018 |
| JP | H0747325 | A | 2/1995 |
| JP | 3185312 | U | 8/2013 |
| KR | 20-0192546 | Y1 | 8/2000 |
| KR | 20110096211 | A | 8/2011 |
| KR | 10-1229696 | B1 | 2/2013 |
| KR | 101455651 | B1 | 10/2014 |
| KR | 1020140119824 | A | 10/2014 |
| WO | 2007122094 | A1 | 11/2007 |
| WO | 2009029926 | A1 | 3/2009 |
| WO | WO 2009/137425 | A2 | 11/2009 |
| WO | WO 2009/140472 | A1 | 11/2009 |
| WO | 2010/080365 | A1 | 7/2010 |
| WO | WO 2017074337 | A1 | 5/2017 |
| WO | WO 2019/209801 | A1 | 10/2019 |

(56) References Cited

FOREIGN PATENT DOCUMENTS

OTHER PUBLICATIONS

International Search Report and Written Opinion for International Patent Application No. PCT/US2022/015031, mailing date of May 26, 2022, filing date of Feb. 3, 2022, 13 pages.
International Search Report and Written Opinion for International Patent Application No. PCT/US2021/019542, mailing date of Jun. 17, 2021, filing date of Feb. 25, 2021, 14 pages.
Non-Final Office Action for U.S. Appl. No. 17/182,717 dated Aug. 4, 2022, 10 pages.
International Preliminary Report on Patentability for International Patent Application No. PCT/US2021/019542, mailing date of: Oct. 6, 2022, 8 pages.
Notice of Allowance for U.S. Appl. No. 17/182,717, dated Feb. 24, 2023, 8 pages.
First Office Action from Chinese Application No. 201080052349.X, issue date May 16, 2014. With English Translation. 17 Pages.
Second Office Action from Chinese Application No. 201080052349.X, Issuing Date: Oct. 30, 2014, 14 pages with English Translation.
PCT/US2010/055051 Communication Relating to the Results of the Partial International Search dated Feb. 14, 2011. 2 pages.
Wagner Wideshot Power Painter, Owner's Manual, 20 pp, dated Oct. 2006.
Graco press release New HVLP TurboForce, dated Jan. 3, 2009, accessed at http://public.graco.be/0/?d=588, 3 pages.
Binks Model 18N Spray Gun, dated Apr. 1989, accessed at http://www.binks.com/Service%20Bulletins/77-1795r-12.pdf on Sep. 4, 2009, 4 pages.
Wagner The Painting People Control Spray Owners Manual, pp. 1 and 4-6 (4 pages total), © 2005 Wagner Spray Tech, Commercially Available 2005.
Views of the Commercially Available product of Non-Patent Literature Documents (previously referenced, see above), 1 page, 2005.
PCT/US2010/055051 International Search Report and Written Opinion mailed May 9, 2011, 15 pages.
Graco, Fine Finish Solutions, dated Dec. 2008, accessed at http://www.graco.com/Distributors/DLibrary.nsf/Files/300564/$file/300564G.pdf on Nov. 19, 2009, 13 pages.
International Search Report and Written Opinion for International Patent Application No. PCT/US2018/044600, mailing date: Nov. 16, 2018, filing date: Jul. 31, 2018, 17 pages.
Prosecution History for U.S. Appl. No. 15/704,745 including: Amendment dated Sep. 14, 2018, Non- Final Office Action dated May 16, 2018, and Application and Drawings filed Sep. 14, 2017, 47 pages.
International Search Report and Written Opinion for US Patent Application No. PCT/US2018/044603, date of mailing: Nov. 27, 2018, date of filing: Jul. 31, 2018, 20 pages.
Final Office Action for U.S. Appl. No. 15/704,745 dated Jan. 24, 2019, 13 pages.
International Preliminary Report on Patentability for International Patent Application No. PCT/US2018/044600, mailing date of: Mar. 26, 2020, 13 pages.
International Preliminary Report on Patentability for International Patent Application No. PCT/US2018/044603, mailing date of: Mar. 26, 2020, 14 pages.
First Office Action for Chinese Patent Application No. 201880056898.0 dated Nov. 27, 2020, 20 pages with English Translation.
Prosecution History for U.S. Appl. No. 15/704,670 including: Corrected Notice of Allowance dated Jan. 14, 2021, RCE dated Jan. 7, 2021, Notice of Allowance dated Jul. 15, 2020, Amendment After Final dated Jul. 1, 2020, Final Office Action dated Apr. 7, 2020, Amendment dated Jan. 20, 2020, Non-Final Office Action dated Sep. 20, 2019, Amendment with RCE dated Apr. 22, 2019, Final Office Action dated Jan. 24, 2019, Amendment dated Sep. 14, 2018, and Non-Final Office Action dated May 16, 2018, 136 pages.
Office Action for Chinese Patent Application No. 202180022110.6, dated Jan. 24, 2024, 23 pages including English Translation.
First Chinese Office Action for Chinese Application No. 202180022110.6 dated Jul. 27, 2023, 23 pages.
Extended European Search Report for European Application No. EP22856357.3, mailed Jun. 27, 2025, 08 Pages.
Application and Drawings for U.S. Appl. No. 17/182,717, dated Feb. 23, 2021, 58 Pages.
Application and Drawings for U.S. Appl. No. 17/400,245, dated Aug. 12, 2021, 65 Pages.
International Preliminary Report on Patentability for International Application No. PCT/US2022/015031, dated Feb. 22, 2024, 7 Pages.

* cited by examiner

FLUID APPLICATOR

CROSS-REFERENCE TO RELATED APPLICATION

The present application is a continuation of and claims priority of U.S. patent application Ser. No. 17/182,717, filed Feb. 23, 2021, which is based on and claims the benefit of U.S. provisional patent application Ser. No. 63/000,516, filed on Mar. 27, 2020, the contents of which are hereby incorporated by reference in their entirety.

BACKGROUND

A fluid spraying system may be used by an operator to deliver a fluid from a fluid source to an application area. For example, paint may be sprayed, or otherwise applied, by an applicator, such as a spray gun, to an application area, such as a surface of a wall. In order to deliver the different fluids from the fluid source to the application area, a conveyance system, such as a pump, can be used to convey the fluid from the fluid source, under pressure, through a fluid passageway and out of an outlet of the applicator to be applied to the application area. The pressure generated by the conveyance system can require the fluid spraying system to have certain structural features and material integrity (e.g., pressure ratings) to allow safe and efficient operation of the fluid spraying system.

The discussion above is merely provided for general background information and is not intended to be used as an aid in determining the scope of the claimed subject matter. The claimed subject matter is not limited to implementations that solve any or all disadvantages noted in the background.

SUMMARY

A fluid applicator configured to receive a pressurized fluid includes a pressure vessel configured to receive the pressurized fluid from a fluid delivery line. The pressure vessel includes a valve chamber configured to receive a valve assembly, a filter chamber configured to receive a filter assembly, and a fluid delivery line fitting configured to be coupled to the fluid delivery line. The fluid applicator further including a tip assembly coupled to the pressure vessel and configured to atomize the pressurized fluid.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

Figure 1:
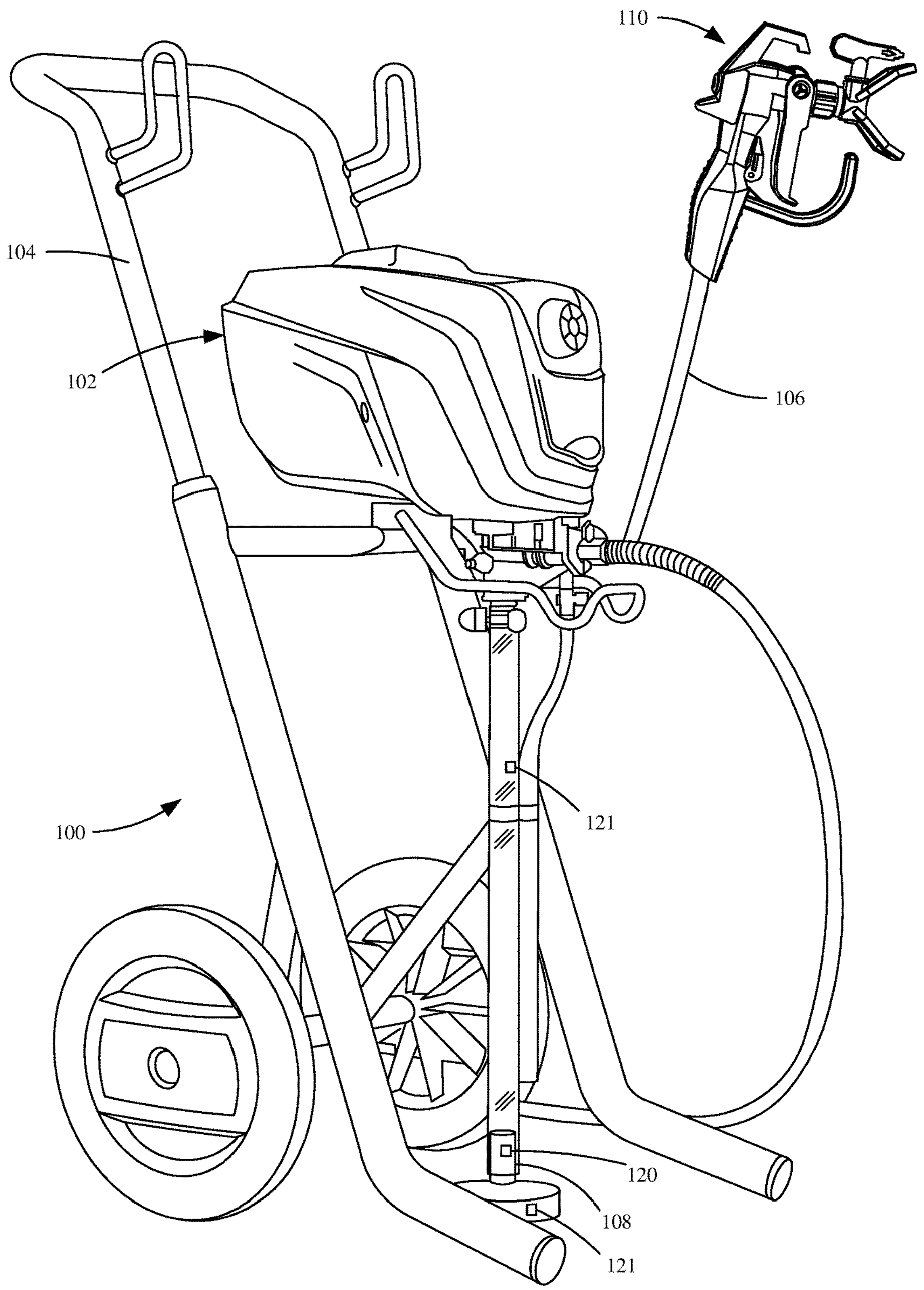
FIG. 1 is a perspective view showing one example fluid applicator system.

While the above-identified figures set forth one or more examples of the disclosed subject matter, other examples are also contemplated, as noted in the disclosure. In all cases, this disclosure presents the disclosed subject matter by way of representation and not limitation. It should be understood that numerous other modifications and examples can be devised by those skilled in the art which fall within the scope and spirit of the principles of this disclosure.

DETAILED DESCRIPTION

Spraying systems, such as airless spraying systems, work by pumping fluid at pressure through a fluid delivery line and out of an outlet in a spray tip. The pump (or other conveyance mechanism) can, in some instances, pressurize the fluid at very high pressures, for example, 1500-3500 pounds per square inch (PSI). In some cases, safety and/or industry standards may require that the spraying system have a pressure rating up to or at least three times the operating pressure.

For the spraying system to withstand these operating pressures such that the fluid pathway maintains a seal, relatively robust materials (e.g., metal) and/or additional parts can be required. For instance, separate fittings for fluidic connection of the fluid delivery line to the valve pressure vessel and/or a separate fluid conduit disposed within the fluid applicator such that items of the fluid applicator (such as walls of the valve pressure vessel) are not directly contacted by the pressurized fluid. These robust materials and additional parts can increase the cost and difficulty of manufacturing and maintenance as well as reduce the ease of use for an operator and/or user, for instance, robust materials and/or additional parts can increase the weight of the fluid applicator and thus increase an operator's fatigue or make it more difficult for the operator to maneuver the fluid applicator desirably.

In addition, internal components of typical spraying systems can be difficult for a user to install, replace or otherwise access, such as for maintenance. For example, in some spraying systems the filter is located within the gun handle and the fluid delivery line is coupled to a separate fitting, such as a separate fitting coupled to the bottom of the gun handle. In order to access the filter in such systems, an operator and/or user has to disrupt the connection between the fluid delivery line and the fitting to get to the filter within the gun handle. This can increase downtime of the spraying system, increase cost of maintenance, as well as lead to waste, such as spilling of fluid or wearing of the coupling (e.g., threads) between the fluid delivery line and the fitting.

Provided herein is an improved fluid applicator that reduces or eliminates the need for additional parts and robust materials and is able to withstand the operating pressures of various spraying systems, including airless spraying systems operating at high pressures (e.g., 1500-3500 psi).

The fluid applicator, including the valve pressure vessel, can be molded entirely or partially of various polymers, such as plastic or nylon (such as glass-filled nylon). The fluid applicator can include an internal (e.g., incorporated into the molding material) or external (e.g., applied topically, such as by coating) additive, such as an anti-static additive to reduce or eliminate dust attraction as well as to dissipate electrostatic discharge (ESD). The valve pressure vessel can include an integrated (e.g., molded as part of) fluid delivery line fitting such that the fluid delivery line can be coupled directly to the valve pressure vessel without the need for additional and/or separate fittings. Thus, a valve pressure vessel disclosed herein can include an integrated fluid delivery line that forms or is part of the body of the valve pressure vessel. The valve pressure vessel can include an opening on an end (e.g., the upstream end, rear end, the end opposite the tip, etc.) configured to provide access to an interior of the valve pressure vessel as well as to allow the installation and/or removal of a valve assembly and a filter assembly without the need to disrupt the coupling between the fluid delivery line and the valve pressure vessel.

The interior of the valve pressure vessel can include a valve chamber configured to receive the valve assembly and a filter chamber configured to receive the filter assembly. The filter assembly can include a filter device that is partially within and partially without the valve pressure vessel such that a user is able to access and/or remove the filter from the rear of the fluid applicator. In one example, The fluid applicator can include two separately molded handle portion halves that are configured to be securely fit over portions of the valve pressure vessel and the fluid delivery line. The handle portion halves can include various integrated items and/or features as part of the molded body of the handle portion halves or otherwise mounted to the handle portion halves.

The fluid applicator can also include a tip assembly having a spherical or tapered seal surface. The tip assembly is configured such that the tip has various degrees of freedom of movement. The tip assembly can be coupled directly to the valve pressure vessel, using various coupling techniques. For example, the tip assembly can include an attachment mechanism that can crimp directly to the valve pressure vessel and still allow, in one example, rotational movement of the attachment mechanism for purpose of coupling (e.g., threading) to the tip assembly. Additionally, the tip can be removable from the fluid applicator (and the tip assembly) and can include a keying mechanism configured to mate with a corresponding keying mechanism of the filter such that the tip can act as tool for installing and uninstalling the filter to the fluid applicator.

The items and features described above are merely examples. A fluid applicator with these, as well as various other items and/or features is described herein.

While fluid applicators and spraying systems described herein are described with respect to the dispersal of fluids, specifically liquid fluids such as paint or other coating material, it is envisioned that at least some embodiments herein may be useful in accordance with applicators configured to apply other material, for example textured material, plural components, etc.

FIG. 1 is a perspective view showing one example fluid applicator system 100. Fluid applicator system 100, illustratively shown as an airless fluid spraying system, includes pump 102 that is mounted on a cart 104 and couples to applicator 110 through fluid delivery line 106. Pump 102 includes a fluid intake 108 that is disposed within a fluid source (e.g., a five-gallon bucket of paint). Pump 102 pumps the fluid from the fluid source through fluid intake 108 and pumps the fluid at a given pressure to applicator 110 through fluid delivery line 106. In one example, pump 102 can pressurize the fluid between 1500-3500 PSI. Fluid applicator system 100 can include a number of different sensors or other detectors that detect certain characteristics of the fluid, the spraying system, and various other characteristics relative to the delivery of fluid. As illustrated in FIG. 1, identification device 120 that senses a type of fluid (e.g., a type of paint) can be mounted on fluid intake 108. Alternatively, or in addition, a fluid level sensor 121 senses the amount of remaining fluid in the fluid source (via ultrasound, pressure, etc.). When the fluid is running low a user may be notified. For example, an alert on a remote/mobile device may notify the user. As another example, a haptic, visual or audible alert on the applicator may notify the user. The fluid level sensor 121 may also track usage overtime and notify a user at given intervals. For example, a user may want to be notified when they have three-quarters remaining, one half remaining, one-quarter remaining, etc. This may be useful in helping an operator and/or user maintain an even coat of fluid coverage over a large spraying job. These are examples only. Various other sensors and detectors can be incorporated into fluid applicator system 100.

Figure 2:
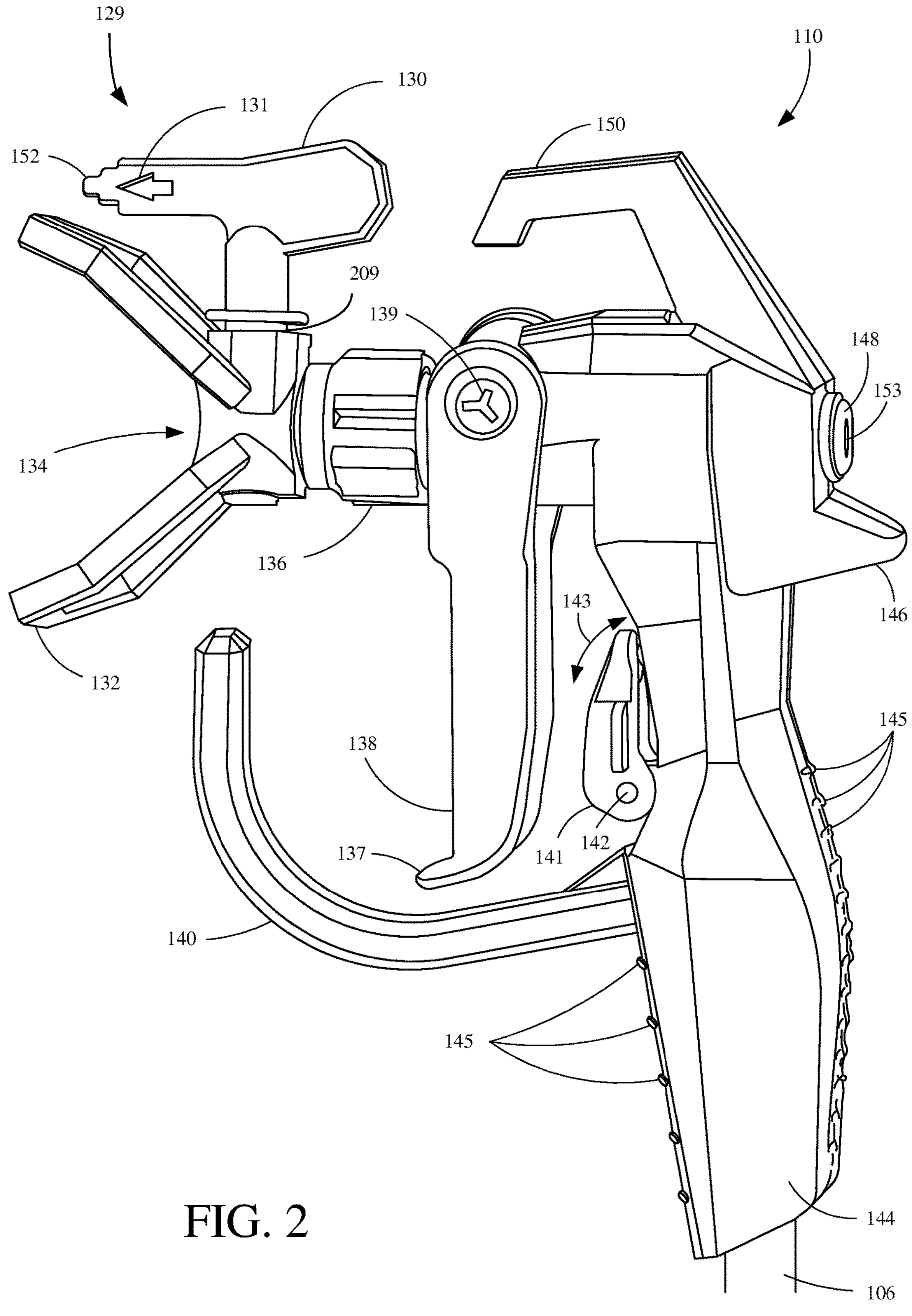
FIG. 2 is a perspective view showing one example fluid applicator.

FIG. 2 is a perspective view showing one example fluid applicator 110. Fluid applicator 110 can be similar to the fluid applicator of FIG. 1 or can be a different type of fluid applicator as well. Applicator 110, illustratively shown as a spray gun, includes fluid delivery line 106, tip 129, outlet guard 132, outlet 134, attachment mechanism 136, trigger 138, trigger guard 140, trigger lock 141, handle 144, protrusion 146, filter 148, and hook 150. Applicator 110 receives fluid through an inlet (shown in FIG. 3), for example, from delivery line 106 and into and through the inlet. As will be shown in more detail below, applicator 110 includes, as part of a pressure vessel, an integrated fluid delivery line fitting and a fluid delivery line 106 that extends through handle 144 and couples to the integrated fluid delivery line fitting.

Trigger 138 is pivotally mounted to the valve pressure vessel at pivot point(s) 139, which can include any number of rotatable fastening and/or attachment mechanisms. Trigger 138 is actuatable (e.g., by an operator and/or user) to allow (e.g., by actuating a valve in the valve pressure vessel) fluid flow from the inlet to outlet 134 of tip 129 where the fluid is expelled. Trigger 138 can also include protruding portion 137, which extends substantially perpendicularly from a bottom end of trigger 138. Protruding portion 137 can act as a hand and/or finger rest for an operator when operating (e.g., gripping handle 144, actuating trigger 138, etc.) fluid applicator 110. The size of applicator 110 can be such that only a portion of an operator's hand, such as a number of fingers, is needed to effectively actuate trigger 138. Providing a hand and/or finger rest can provide additional grip and reduce or eliminate fatigue.

As illustrated in FIG. 2, a trigger guard 140 can be coupled to or otherwise be an integral part of handle 144 and can, for instance, protect trigger 138 from accidental or unintended actuation. Additionally, trigger guard 140 (e.g., the surface of trigger guard 140 facing trigger 138) can act as a hand and/or finger rest for an operator when operating (e.g., gripping handle 144, actuating trigger 138, etc.) fluid applicator 110. Trigger lock 141 can be pivotally mounted to handle 144 at pivot point(s) 142, which can include any number of rotatable fastening and/or attachment mechanisms. Trigger lock 141 is deployable (e.g., by user actuation) between a storage position and a locking position as indicated by arrow 143. As illustrated in FIG. 2, trigger lock 141 is in the storage position which allows actuation (e.g., rearward movement) of trigger 138. On the other hand, in the locking position, trigger lock 141 is moved to a substantially perpendicular position relative to a vertical axis of trigger 138 and/or handle 144 and prevents actuation (e.g., rearward movement) of trigger 138.

Additionally, handle 144 can include a number of surface features 145, illustratively shown as protrusions (e.g., ridges, bumps, etc.) that can improve a user's grip of handle 144. Applicator 110 can further include protrusion 146 mounted to or as an integral part of handle 144. Protrusion 146 can, in one example, serve as a hand stop for proper alignment of a user's hand for operation of applicator 110 as well as to prevent accidental contact with, for example filter 148. Additionally, hook 150 can be mounted to or an integral part of handle 144. Hook 150 can, in one example, serve as a storage mechanism for applicator 110. For instance, a user can hang applicator 110 from or otherwise removably couple to any number of items, such as a hook, nail, screw, rod, etc. which can be a part of cart 104.

Returning to the operation of applicator 110, fluid flows through fluid delivery line 106 which is partially disposed within handle 144 and then into and through an inlet. Through the inlet, the fluid enters the valve pressure vessel and encounters filter 148 which is partially and rearwardly (relative to outlet 134) disposed in the valve pressure vessel. Filter 148 filters out unwanted contaminants in the fluid before it is applied to the application area. Filter 148 will be discussed in more detail below. From filter 148, the fluid flows to and past a valve (e.g., needle valve) which is actuatable (by actuation of trigger 138) between a seated an unseated position. Fluid then encounters a tip 129 (illustratively shown in FIG. 2 as including a flag 130 and stem tip body 209 assembly), which can include a number of internal geometries (e.g., turbulence structures, outlet design, etc.), as well as additional features (as will be discussed in greater detail below), and out of outlet 134 of tip 129 to be applied to the application area.

Tip 129 can be removable and can be replaced with the same or different type of tip. Often, different types of tips can be used for a different type of spray pattern or to accommodate different types of fluid to be applied by applicator 110. Tip 129 is coupled to the valve pressure vessel by attachment mechanism 136 which can be mounted to the valve pressure vessel using any suitable techniques (some examples of which will be discussed below). As illustrated in FIG. 2, tip 129 can also include keying mechanism 152 which, as shown, is a keyed protrusion on the front of tip 129. Additionally, tip 129 can include indicator 131, illustratively shown as an arrow, which can indicate the proper alignment and/or installation of tip 129 for applying the pressurized fluid on to a surface. As illustrated in FIG. 2, indicator 131 and/or keying mechanism 152 can be components of flag 130, such that they are formed as portions of flag 130.

Because of the fluid pressures at which fluid applicator 110 can operate, filter 148 must be securely fastened to applicator 110 and only removable by a tool rather than, for instance, a user's hand. Filter 148, as illustrated, can include a keying mechanism 153, which, as shown, is a keyed recess on the exposed end and in the body of filter 148. Keying mechanism 152 of tip 129 is configured to be inserted into keying mechanism 153 of filter 148. In this way, tip 129 can act as tool for the safe removal of filter 148. This also provides the added benefit of reducing the number of items that a user must bring to a worksite, or as a secondary option if other removal tools are otherwise unavailable. Also, by removing tip 129 from applicator 110 for the removal of filter 148, applicator 110 is more likely to be prevented from use during filter removal/replacement, similar to a lockout-tagout procedure, for instance.

Additionally, fluid applicator 110 includes an outlet guard 132 which can, in one example, serve to prevent a user from placing a portion of their body (e.g., hand, finger, etc.) proximate outlet 134 and/or from placing outlet 134 proximate a surface or item. The pressure at which fluid is sprayed from applicator 110 can, in some instances, cause damage.

Figure 3:
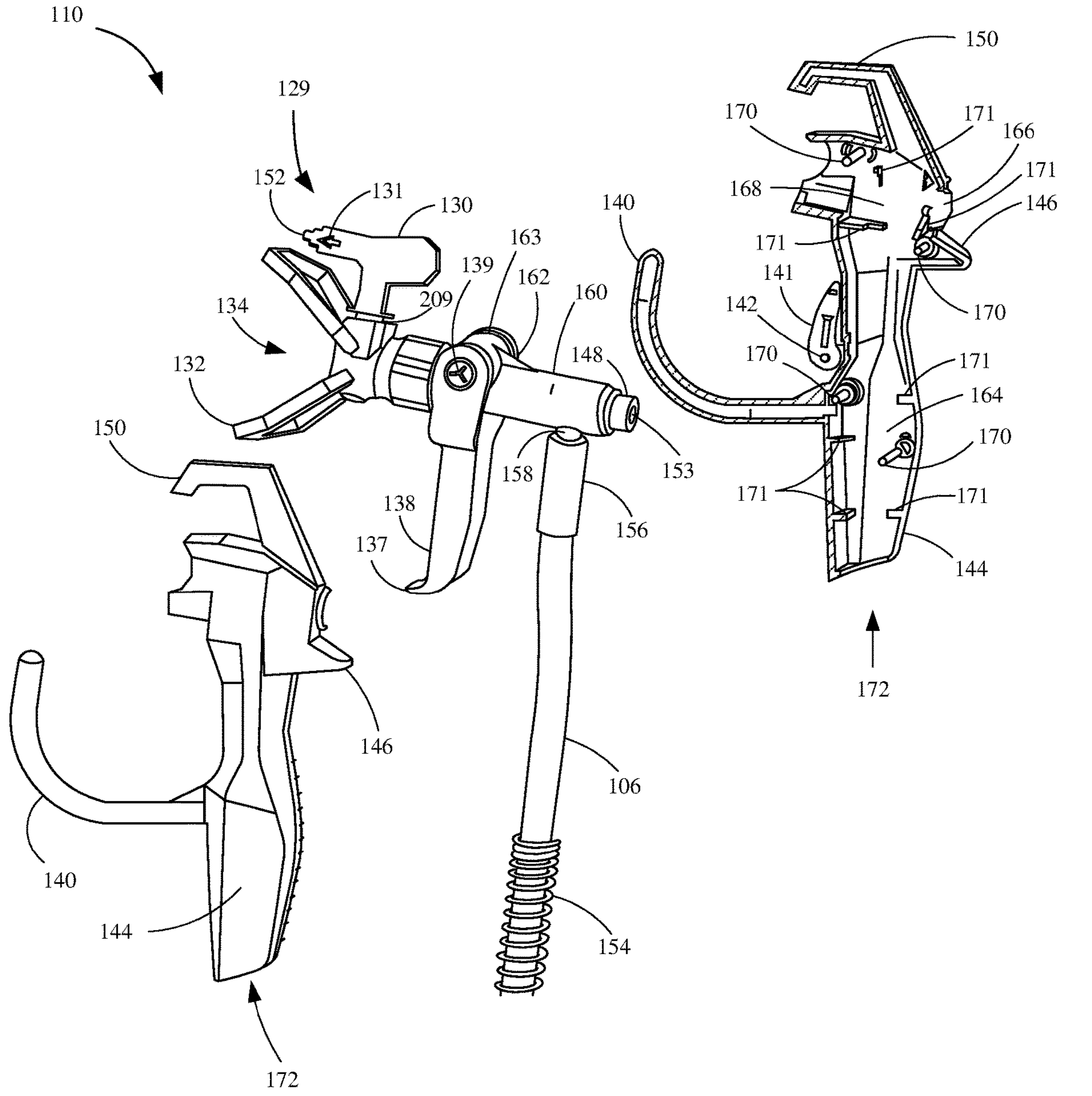
FIG. 3 is an exploded view showing one example fluid applicator.

FIG. 3 is an exploded view showing one example fluid applicator 110. FIG. 3 shows the additional components of fluid applicator 110. In addition to the items illustrated in FIG. 2, which are numbered similarly, fluid applicator 110 includes delivery line coil 154, fluid delivery line attachment mechanism 156 (illustratively shown and referred to as crimp ferrule 156), fluid delivery line fitting 158 (illustratively shown and referred to as hose barb 158), valve pressure vessel 160, support structure(s) 162, mounting mechanism 163, cavities 164 to 168, coupling mechanisms 170, alignment mechanisms 171 and handle portion halves 172.

As illustrated, applicator 110 can include two handle portion halves 172. Handle portion halves 172 can be hollowed-out halves, as represented by cavities 164, 166 and 168, that are configured to be coupled together by coupling mechanisms 170 and fit around components of applicator 110 in a proper alignment defined by alignment mechanisms 171. As illustrated, cavity 164 is configured to receive and fit around delivery line 106, crimp ferrule 156 and hose barb 158, the proper fit and alignment (e.g., pathway within cavity 164) being defined by alignment mechanisms 171. Cavity 166 is configured to receive and fit around filter 148. Cavity 168 is configured to receive and fit around valve pressure vessel 160 and support structure 162, the proper fit and alignment (e.g., pathway within cavity 168) being defined by alignment mechanisms 171.

Handle portion halves 172 can be separately manufactured parts that are coupled together around components of applicator 110. For example, handle portion halves 172 include coupling mechanisms 170 and alignment mechanisms 171 to provide proper coupling and alignment of handle portion halves around components of applicator 110. Additionally, handle portion halves 172 can be molded (e.g., injection molded) and can include whole or partial portions of other components of applicator 110. As shown, for example, handle portion halves 172 include corresponding halves of trigger guard 140, protrusion 146, and hook 150, while trigger lock 141 is a separate component that is coupled to the further of the handle portion halves 172 (though it could be couple to the other handle portion halve 172). Handle portion halves 172 can be fit around other components of applicator 110 and fastened together with coupling mechanisms 170, which can include mating mechanisms (e.g., matching protrusions and recesses), threaded slots configured to receive fasteners (e.g., screws, bolts, etc.), as well as any number of other suitable fastening techniques. In one example, handle portion halves 172 can be coupled together by sonic welding, in addition to or instead of, coupling mechanisms 170.

Fluid delivery line 106 is configured to extend within handle portion halves 172 and couple to hose barb 158 (shown and discussed in more detail below). As illustrated, delivery line 106 is secured to hose barb 158 by crimp ferrule 156 such that a portion of delivery line 106 is crimped onto hose barb 158. Crimp ferrule 156 can be formed of various materials, including, but not limited to, various polymers, metals, as well as any other suitable materials. Hose barb 158 is, in one example, an integrated part of valve pressure vessel 160 such that delivery line 106 couples directly to pressure vessel 160. This will be discussed in more detail below. In any case, fluid is delivered to an interior of pressure vessel 160 through delivery line 106 and hose barb 158 (which acts as an inlet to the interior of pressure vessel 160). Pressure vessel 160 can include a filter 148 (or a portion thereof), a valve (shown below), as well as other items, as will be discussed further herein.

Fluid delivery line 106 can be a flexible hose (such as a hose assembly, including a laminated internal sleeve and woven fabric) that allows a user more freedom of movement when operating applicator 110. Delivery line 106, as illustrated, includes fluid delivery line coil 154 which can help to maintain the flexibility of delivery line 106 while preventing interference with fluid movement through delivery line 106, which can be caused by the operation or storage of applicator 110, for example, but not limited to, kinks, knots, twists, ties, etc. in delivery line 106. Additionally, coil 154 can protect delivery line 106 from damage which can interfere with fluid movement through or otherwise deteriorate deliver line 106, for instance, punctures, dents, etc., by preventing objects from coming into direct contact with delivery line 106.

Pressure vessel 160 can include additional items and features. As shown, pressure vessel 160 includes mounting mechanism 163 which is configured to receive and house portions of a rotatable valve actuating mechanism such that trigger 138 can be pivotably coupled to pressure vessel 160 at pivot point(s) 139. In one example, mounting mechanism 163 has a hole therethrough configured to receive portions of the rotatable valve actuating mechanism. The rotatable valve actuation mechanism can include mating features (e.g., protrusions, male mating features, etc.) on each of its respective ends and trigger 138 has corresponding mating features (e.g., recesses, female mating features, etc.) which receive the mating features of the fastening mechanism (though the male and female mating features can be reversed, e.g., the recesses can be on the rotatable fastening mechanism and the protrusions can be on trigger 138). In one example, this allows the trigger to be "snapped-on." This is shown in more detail below. The fit between the hole of mounting mechanism 163 and the rotatable valve actuating mechanism can be such that actuating mechanism is securely coupled to fluid applicator 110 but still rotatable within mounting mechanism 163. Support structure(s) 162 is an integral part of pressure vessel 160 and provides additional support/strength to fluid applicator 110. For example, support structure(s) 162, illustratively shown as radii on the external surface of valve pressure vessel 160 can absorb and/or disperse pressure and/or stress applied to valve pressure vessel 160. For instance, stress and/or pressure can be applied to valve pressure vessel 160 by the actuation of trigger 138. Additionally, support structure(s) 162 can absorb and/or disperse pressure and/or stress applied (e.g., by the pressurized fluid) to valve pressure vessel 160, for example at the intersections of bores/apertures within valve pressure vessel 160. This will be discussed in more detail below.

Figure 4:
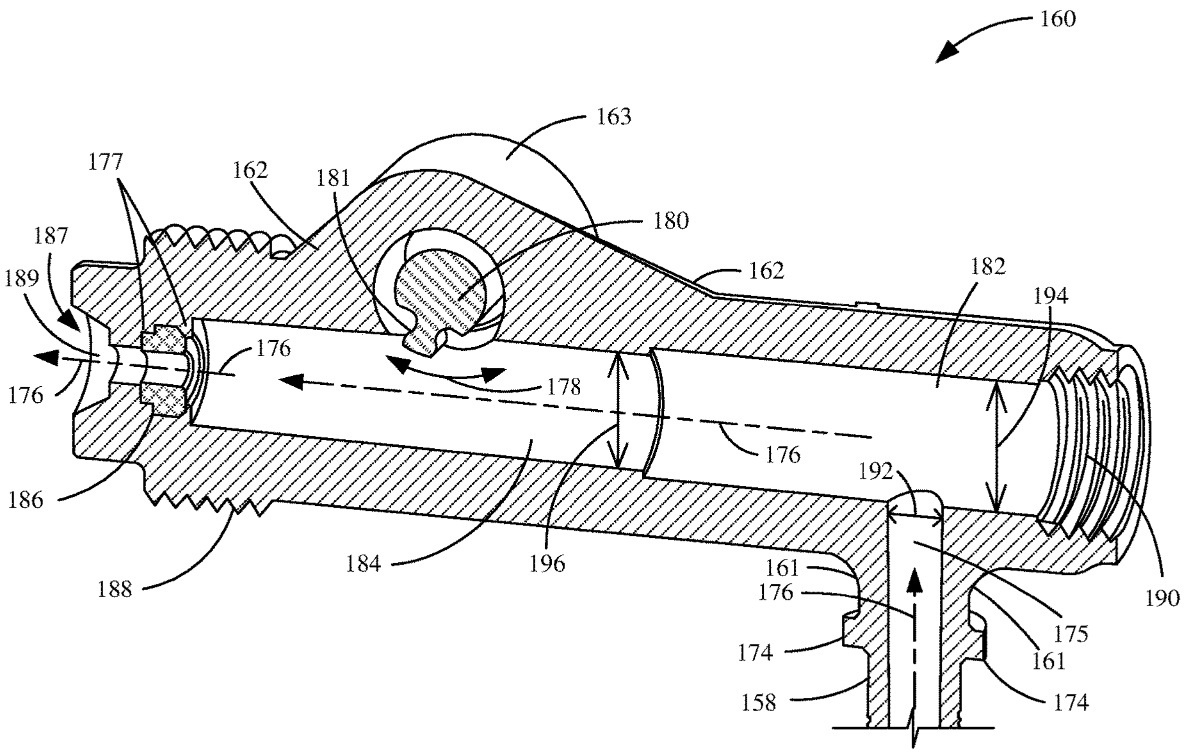
FIG. 4 is a cross-sectional view showing one example valve pressure vessel.

FIG. 4 is a cross-sectional view showing valve pressure vessel 160 in more detail. FIG. 4 shows the additional components, including internal components, of pressure vessel 160. In addition to the items illustrated in FIG. 3, which are numbered similarly, pressure vessel 160 includes support structure(s) 161, ribs 174, inlet 175, flow path 176, shoulder(s) 177, valve actuating mechanism 180, filter chamber 182, valve chamber 184, valve seat 186, valve pressure vessel outlet 187, recess 189, coupling features 188 to 190, and internal diameters 192, 194, and 196.

Figure 8:
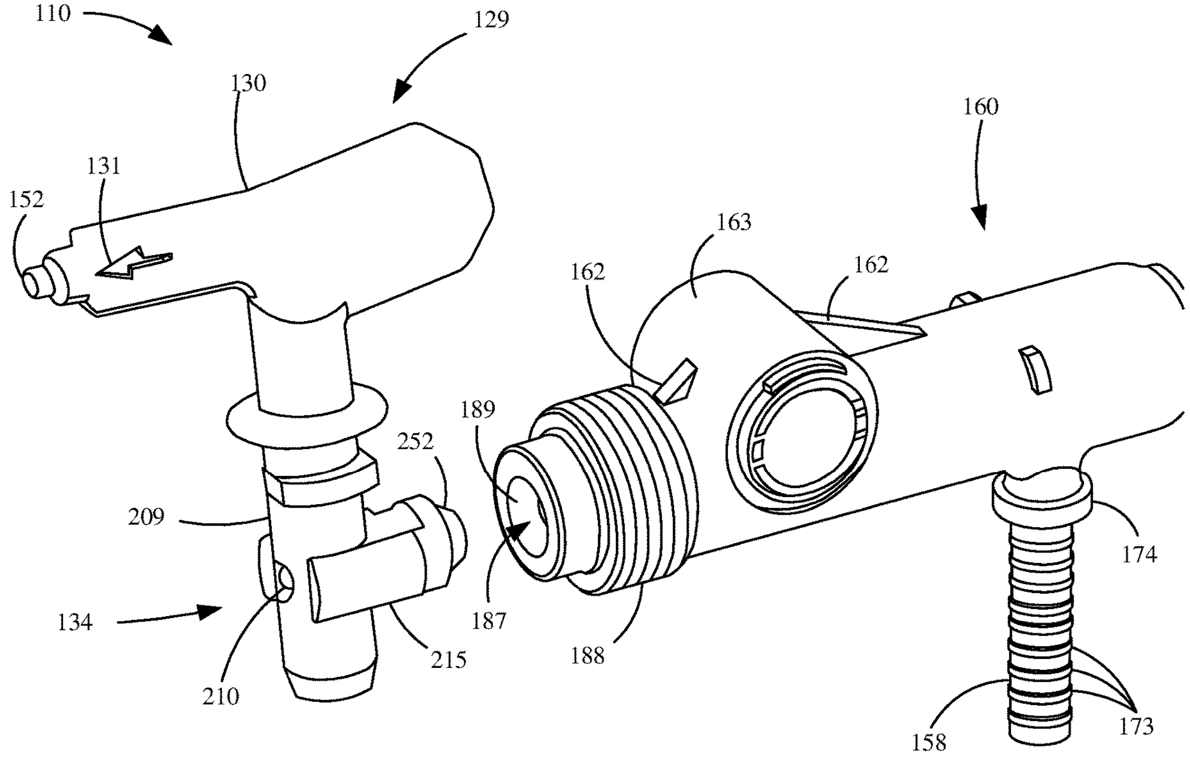
FIG. 8 is a perspective view showing one example fluid applicator.

As illustratively shown, valve pressure vessel 160 is configured to receive pressurized fluid from delivery line 106 through inlet 175, defined by internal diameter 192 of hose barb 158. Delivery line 106 can be coupled to hose barb 158 (and thus fluidically coupled to inlet 175) by crimping (e.g., with crimp ferrule 156) a portion of delivery line 106 to hose barb 158. As an integrated component of pressure vessel 160 (e.g., forms or is a part of the body of pressure vessel 160), hose barb 158 eliminates the need for a separate (e.g., separately machined and/or attached) fitting for the connection of delivery line 106 to valve pressure vessel 160. This can simplify the manufacturing process, reduce the amount of areas within fluid applicator 110 that are subject to leakage, and can reduce the cost of fluid applicator 110 as well as improve the ease of use and functionality. As shown, hose barb 158 includes at least one rib 174 that can establish a depth of fitting 158 within fluid delivery line 106. Hose barb can also include one or more barbs or ribs (as shown in FIG. 8) that provide additional fastening and/or sealing strength (e.g., extra grip, hold strength, such as by digging into fluid delivery line 106, etc.) to the crimp between fluid delivery line 106 and hose barb 158.

Valve pressure vessel 160 further includes support structure(s) 161, illustrated as external radii extending along the external surface of valve pressure vessel 160. Like support structure(s) 162, support structure(s) 161 can provide additional support/strength to fluid applicator 110. For example, support structure(s) 162 can absorb and/or disperse pressure and/or stress applied to valve pressure vessel 160. For example, stress and/or pressure applied to hose barb 158 by the installation and/or removal of fluid delivery line 106, twisting and turning of fluid applicator 110 (and thus twisting and turning of fluid deliver line 106), etc. Additionally, support structure(s) 161 and 162 are located along valve pressure vessel 160 such that they can absorb and/or disperse pressure and/or stress applied (e.g., by the pressurized fluid) to valve pressure vessel 160. In some examples, support structure(s) 161 and 162 are placed proximate the intersections of bores/apertures within valve pressure vessel 160 to absorb and/or disperse stress and/or pressure that occurs at those intersections.

For example, support structure(s) 161 absorb and/or disperse stress and/or pressure at the intersection of inlet 175 and filter chamber 182 as well as at the intersection of the internal diameter of delivery line 106 and inlet 175. In another example, support structure(s) 162 absorb and/or disperse stress and/or pressure at the intersection of filter chamber 182 and valve chamber 184, at the intersection of valve chamber 184 and the internal diameter of mounting mechanism 163, and at the intersection of valve chamber 184 and the internal diameter of valve seat 186.

Pressurized fluid travels along a flow path indicated by arrows 176. The internal components and walls of valve pressure vessel 160 are exposed to the pressurized fluid as it travels through hose barb 158 and inlet 175 through filter chamber 182, valve chamber 184 and valve seat 186 and finally through and out of pressure vessel outlet 187 which can be fluidically coupled to a tip assembly and can, in one example, receive a portion of the tip assembly in recess 189, for instance, a tip saddle (as will be shown later).

The movement of pressurized fluid along the flow path 176 is controlled by the actuation of trigger 138 which is pivotably coupled to valve actuating mechanism 180 (as described above). Valve actuating mechanism 180 is actuatable between a first (e.g., valve closed) position and a second (e.g., valve open) position (though mechanism 180 is actuatable to a number of positions in the intermediate between the fully closed and fully open positions), as indicated by arrow 178. As shown, actuating mechanism 180 is in the first position, which corresponds with the position of trigger 138 illustrated in FIG. 2, wherein the valve is closed (e.g., seated against valve seat 186) such that pressurized fluid will not flow through and out of pressure vessel outlet 187. As shown, actuating mechanism 180 includes a protrusion 181 which acts against a portion of the valve to open the valve (e.g., unseat the valve from valve seat 186) as the trigger is actuated to move the actuating mechanism 180 in an upstream direction (e.g., away from pressure vessel outlet 187).

In one example, valve seat 186 is an insert molded component of the injection molded body of valve pressure vessel 160 such that it is an integrated component of the valve pressure vessel. In another example, valve seat 186 is a separate piece of fluid applicator 110 that is installed into the interior of valve pressure vessel 160 wherein it engages a corresponding surface upstream of the valve. Valve seat 186 can be formed of any suitable materials, the same as or different from other components of fluid applicator 110. In one example, valve seat 186 is formed of polymer. In another example, valve seat 186 is formed of carbide or ceramic. These are examples only. Valve seat 186 can be formed of a more resistant material such that it wears less quickly from the force of the flow of pressurized fluid, and thereby requires less frequent replacement. Actuating mechanism 180 and the valve will be shown and discussed in more detail herein.

Additionally, valve pressure vessel 160 includes shoulder(s) 177 which are configured to retain valve seat 186 within valve pressure vessel 160 and prevent movement of valve seat 160 when stress and/or pressure is applied to it (e.g., from the flow of and/or contact with the pressurized fluid). Shoulder(s) 177 can be crafted during the molding process of valve pressure vessel 160. In one example, the wall of valve pressure vessel 160 around valve seat 186 is thickened (e.g., relative to other portions of valve pressure vessel 160) to create an area of high molded in stress to hold the molded body of valve pressure vessel 160 tightly around valve seat 186 to create a high-pressure seal between valve seat 186 and valve pressure vessel 160.

As illustrated, valve pressure vessel 160 also includes coupling features 188 and 190. In the example shown in FIG. 4, coupling feature 188 is an external mating feature (e.g., thread(s)) that is configured to allow coupling between a tip assembly and valve pressure vessel 160. For example, attachment mechanism 136 can be used to couple a tip assembly (e.g., tip 129, outlet guard 132, as well as other items) to valve pressure vessel 160 by fastening or otherwise coupling to coupling feature 188. For example, coupling feature 188 can be an external thread on the outer surface of valve pressure vessel 160 configured to mate with internal threads on an inner surface of attachment mechanism 136. While a thread is discussed, coupling feature 188 can include any number of suitable coupling techniques and/or structures. For example, coupling feature 188 could comprise a rib or shoulder wherein an attachment mechanism is fit over the rib or shoulder and crimped thereon, the rib or shoulder, in combination with the crimp, retaining the attachment mechanism to valve pressure vessel 160. These are examples only.

Coupling feature 190 is an internal mating feature (e.g., thread(s)) that is configured to allow removable coupling between filter 148 and valve pressure vessel 160. For example, coupling feature 190 can be an internal thread on an inner surface of valve pressure vessel 160 that is configured to mate with external threads on an outer surface of filter 148. In this way, filter 148 is installed into the rear of valve pressure vessel 160 and is coaxial with the valve, valve pressure vessel outlet 187 and outlet 134 (as well as other items). This will be discussed in more detail herein. While a mating feature, such as a thread, is discussed, coupling feature 190 can include any number of suitable coupling techniques and/or structures.

Valve pressure vessel 160 also includes a number of internal diameters that define a number of components of valve pressure vessel 160. For instance, internal diameter 192 of hose barb 158 defines inlet 175. Internal diameter 194 defines filter chamber 182 and internal diameter 196 defines valve chamber 184. In one example, internal diameters 192, 194, and 196 (as well as other internal diameters of applicator 110) are limited in dimension (e.g., minimized) to control the amount of stress and/or burst pressure applied to the walls of valve pressure vessel, as well as other items of fluid applicator 110. Generally, as diameters decrease so too does stress and/or burst pressure. By limiting the dimensions of the internal diameters of fluid applicator 110, the stress and/or burst pressure applied to components of fluid applicator 110 can be reduced such that the fluid can be pressurized desirably (e.g. desired and/or suitable pressures for airless spray systems, such as 1500 to 3500 PSI) and valve pressure vessel 160 can be made entirely of polymer and/or substantially entirely of polymer (some components can comprise material other than polymer, such as valve seat 186), such as plastic and/or nylon, for instance, glass-filled nylon.

As can be seen, the dimensionality of internal diameters 192, 194, and 196 can be variable relative to each other. In one example, internal diameters 192, 194, and 196 fall within a range of 0.150 to 0.370 inches. For example, diameter 192 is smaller (e.g., 0.150 inches) compared to diameter 194 (e.g., 0.370 inches). This can reduce the stress and/or pressure at the intersection of the two bores/apertures, that is, the intersection of inlet 175 and filter chamber 182. Similarly, diameter 196 is smaller (e.g., less than 0.370 inches but greater than 0.150 inches) compared to diameter 194 (e.g., 0.370 inches). This can reduce the stress and/or pressure at the intersection of the two bores/apertures, that is, the intersection of filter chamber 182 and valve chamber 184. These are merely examples, internal diameters 192, 194, and 196 can be of any number of dimensionalities. Additionally, all of the internal diameters of fluid applicator 110 can be variable relative to each other and can be of any number of dimensionalities. In some examples, the internal diameters at the intersection of components (e.g., bores in valve pressure vessel 160) are minimized to reduce the stress that can occur there.

Additionally, applicator 110 includes external diameters, as well as material thickness (defined by a difference between the internal diameters and external diameters). The external diameters and the material thickness can also be varied in dimension to affect (e.g., increase) the strength (e.g., pressure rating) of fluid applicator 110.

Figure 5:
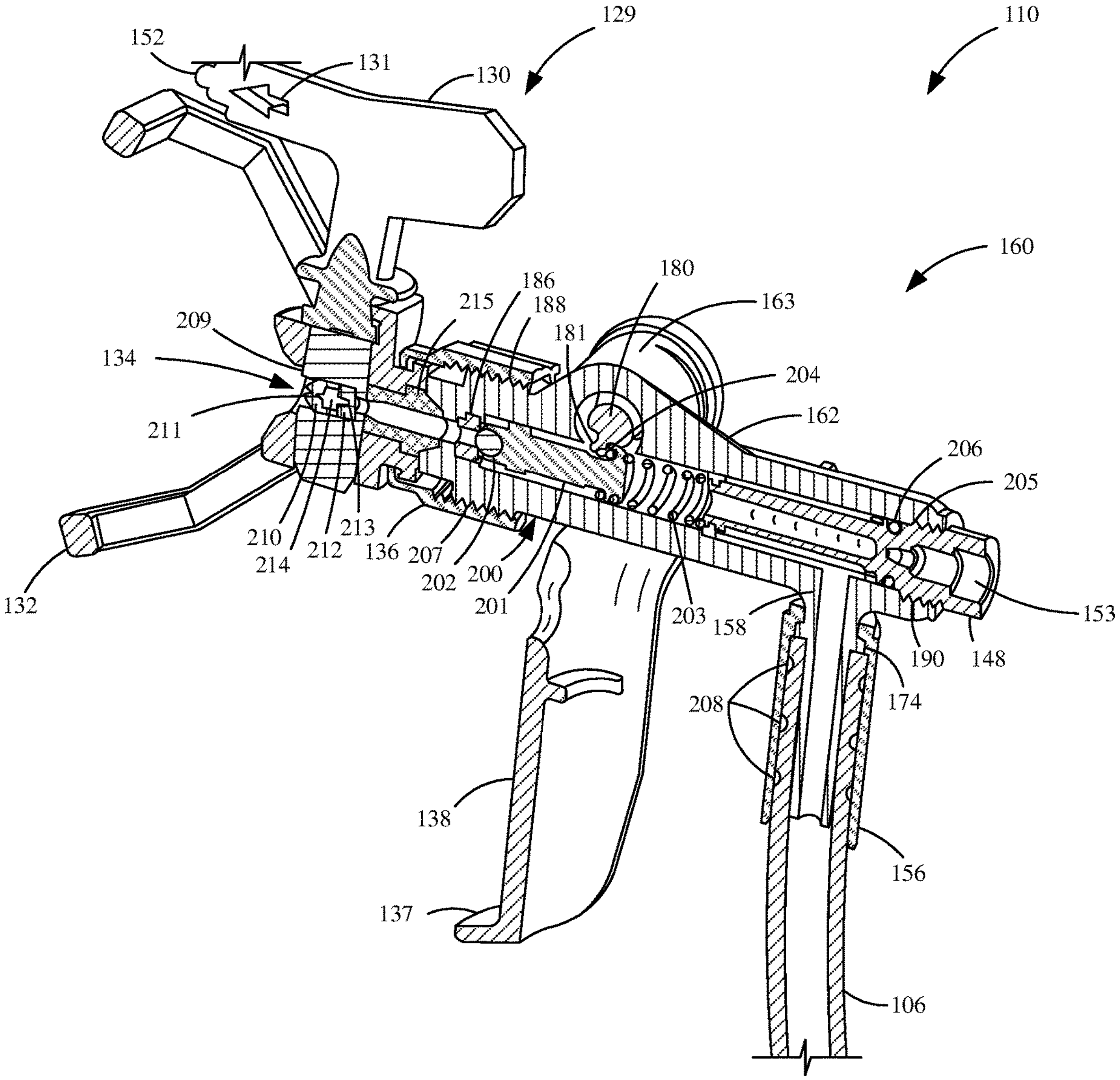
FIG. 5 is a cross-sectional view showing one example fluid applicator.

FIG. 5 is a cross-sectional view showing valve fluid applicator 110 in more detail. FIG. 5 shows additional components, including internal components, of fluid applicator 110. In addition to the items illustrated in previous Figures, which are numbered similarly, fluid applicator 110 includes valve 200, valve drive stem 201, valve seat stem 202, spring 203, valve shoulder 204, coupling features 205 and 207, sealing feature 206, ribs 208, tip piece 210, tip piece inlet portion 211, pre-orifice piece 212, pre-orifice piece outlet portion 213, turbulence chamber 214 and tip saddle 215.

As illustrated, filter 148 is removably coupled in an upstream portion (e.g., filter chamber 182, or a rear-portion relative to outlet 134, valve seat 186, valve pressure vessel outlet 187, etc.) of valve pressure vessel. Filter 148 includes coupling feature 205 on external surface of filter 148 that is configured to mate with (or otherwise fasten to) coupling feature 190. For example, coupling features 190 and 205 can include threads. Filter 148 is removably installed into an opening in the rear of valve pressure vessel and disposed coaxially with valve 200 and outlet 134, and disposed between inlet 175 and valve 200. In this way, pressurized fluid flows through inlet 175 of hose barb 158, into an interior of valve pressure vessel 160 and encounters filter 148 which can filter out unwanted items (e.g., contaminants) from the pressurized fluid. The fluid then continues to flow along flow path 176 until it encounters valve 200. As illustrated, only a portion of filter 148 is disposed within valve pressure vessel 160 while the remainder is external to valve pressure vessel 160. In the example shown, the portion of filter 148 external to valve pressure vessel 160 includes and provides access to keying mechanism 153 such that an operator can use keying mechanism 152 of tip 129 (or another suitable tool) to install and/or remove filter 148. In typical fluid spray systems, the filter is not easily accessibly or removable. For example, in some fluid spray systems the filter is disposed in the handle of the spray gun and requires interruption of the fluid pathway (e.g., decoupling of the delivery line, decoupling of the handle, etc.) to access the filter. This can increase the amount of time it takes to perform maintenance on the filter, as well as numerous other disadvantages, such as wearing the coupling between parts.

Fluid applicator 110 includes additional features that are configured to maintain a sealed integrity of flow path 176. For example, filter 148 includes a sealing feature 206 which creates a sealed interface between filter 148 and a surface of valve pressure vessel 160. Sealing feature 206 prevents backflow and/or leaking of the pressurized fluid as it travels through fluid applicator 110. Sealing feature 206 is located on filter 148 at a distance away from the end of valve pressure vessel 160 (i.e., the opening on the end of valve pressure vessel 160 through which filter 148 is installed) to reduce stress concentration at the end of valve pressure vessel 160. This can reduce the likelihood and/or occurrence of a leak (e.g., blow-out), reduce the pressure and/or stress applied to coupling features, etc. Additionally, this can create a low-pressure and/or low-stress area behind sealing feature 106 at least as compared to the area in front of sealing feature 206. In the example illustrated, sealing feature 206 is an O-ring, but can include any number of suitable sealing techniques and/or structures. Additionally, crimp ferrule 156 includes a number of ribs 208 which provide additional fastening and/or sealing strength (e.g., extra grip, hold strength, such as by digging into fluid delivery line 106, etc.) to the crimp between delivery line 106 and hose barb 158.

From filter 148, the pressurized fluid encounters valve 200. As shown, valve 200 is in first position (closed) seated against valve seat 186 wherein valve seat stem 202 engages valve seat 186 and creates a sealed interface therebetween such that the pressurized fluid is prevented from exiting valve pressure outlet 187. As discussed previously, trigger 138 is actuatable to rotatably move valve actuation mechanism 180 such that protrusion 181 engages valve shoulder 204, disposed on valve drive stem 201, to move valve 200 upstream to a second position (open) unseated from valve seat 186 such that the pressurized fluid can exit valve pressure outlet 187. Spring 203 biases valve 200 towards a closed (or seated) position. Valve 200, when actuated by valve actuation mechanism 180, bears against (and compresses) spring 203. When a user and/or operator releases trigger 136, thus driving movement of protrusion 181 away from valve shoulder 204 (and/or moves protrusion 181 downstream), the biasing of spring 203 drives valve 200 back to a closed, or seated, position.

From valve pressure outlet 187, the pressurized fluid encounters a tip assembly which includes tip 129, flag 130, tip body 209, tip piece 210, pre-orifice piece 212, and tip saddle 215, and can include various other items as well. The tip assembly is coupled to valve pressure vessel 160 by attachment mechanism 136 which includes coupling feature 207, illustratively shown as a mating feature (e.g., thread) on an interior surface of attachment mechanism 136 that is configured to mate with (or otherwise fasten to) coupling feature 188 of valve pressure vessel 160. Tip saddle 215 is sealingly seated within recess 189 of pressure vessel 160 and includes an interior diameter that defines a fluid pathway through tip saddle 215 to pre-orifice piece 212. As shown, tip saddle 215 includes a tapered diameter that sealingly seats tip saddle 215 within recess 189 to form a tapered sealed interface between the tip assembly and valve pressure vessel 160, but in other examples could include a spherical (e.g., ball) surface that allows rotational movement of the tip assembly, as will be discussed further herein. Additionally, as shown in FIG. 5, the thickness of the wall (e.g., the difference between the internal diameter and external diameter of tip saddle 215) of tapered tip saddle 215 is less than the thickness of the walls of valve pressure vessel 160 in the area of recess 189. This allows tip saddle 215 to expand (e.g., due to the application of pressure) more than the walls of valve pressure vessel 160 in the area of recess 189 such that the seal created between tip saddle 215 and valve pressure vessel 160 is pressure assisted. That is, as the pressure within the fluid pathway of tip saddle 215 increases, the force of interference between tip saddle 215 and valve pressure vessel also increases as tip saddle 215 correspondingly expands and acts against valve pressure vessel 160.

Pre-orifice piece 212 is disposed within tip body 209 and includes an internal diameter that defines pre-orifice outlet 213. As shown, pre-orifice outlet 213 comprises an increasing diameter in the upstream to downstream direction but can include any number of dimensional diameters. Pre-orifice outlet 213 is sealingly engaged with tip piece 210 within tip body 209 to form turbulence chamber 214. Turbulence chamber 214 includes dimensionality (e.g., diameters) and structures (e.g., surfaces, shoulders, etc.) which are configured to create turbulence of the pressurized fluid.

From turbulence chamber 214, the pressurized fluid encounters an interior diameter that defines tip piece inlet 211 which comprises a decreasing diameter in the upstream to downstream direction, however, tip piece inlet 211 can include any number of dimensional diameters. Tip piece 210 and tip piece inlet 211 are of design to effectuate a certain spray pattern, flow rate and/or volume of the pressurized fluid from applicator 110, as well as various other characteristics. From tip piece 210, the pressurized fluid exits fluid applicator 110 out of outlet 134 such that the fluid can be applied to a surface.

Figure 6:
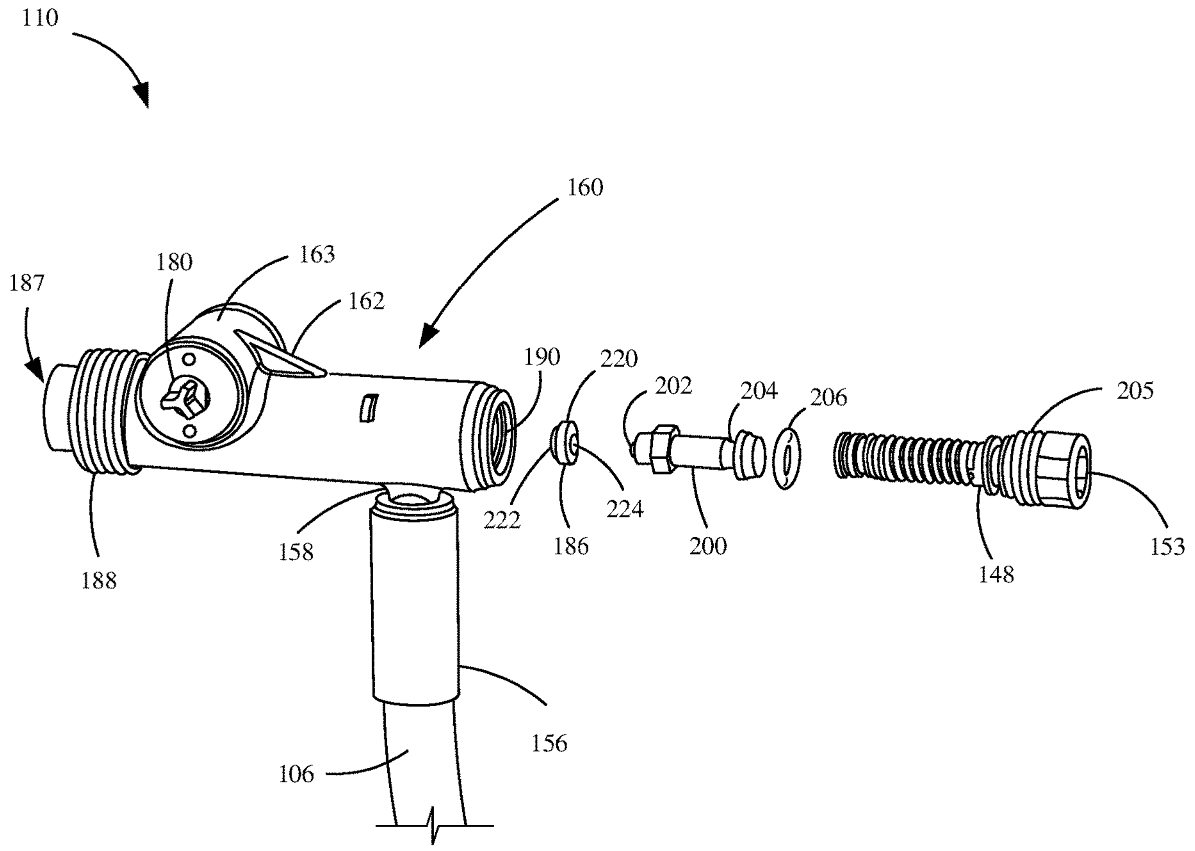
FIG. 6 is a partial exploded view showing one example fluid applicator.

FIG. 6 is a partial exploded view of fluid applicator 110. FIG. 6 shows an example order and method of assembly of internal components of valve pressure vessel 160. In the example illustrated, valve seat 186 is shown as a separate component of valve pressure vessel 160 that is installed in the rear (relative to valve pressure outlet 187) of valve pressure vessel 160. Valve seat 186 can include retaining features, such as an exterior surface with variable diameter such that a portion of valve seat 186 can be tensionably fit (e.g., press fit) into, or otherwise sealingly installed within a corresponding (e.g., mating) portion of the interior of valve pressure vessel 160. As shown in FIG. 6, valve seat 186 includes an upstream portion 220 and a downstream portion 222, upstream portion 220 having a greater external diameter as compared to downstream portion 222. In one example, downstream portion 222 is tensionably and/or sealingly coupled to a corresponding portion of the interior of valve pressure vessel 160 and upstream portion 220 engages a corresponding surface (e.g., a shoulder) in the interior of valve pressure vessel 160 to act as a "cap" in the fluid passageway to maintain a seal between valve seat 186 and the interior surface of valve pressure vessel 160. Additionally, valve seat 186 has an inner diameter that defines aperture 224 which defines a fluid pathway for the pressurized fluid through the valve seat and is configured to receive valve seat stem 202 of valve 200 to restrict the flow of the pressurized fluid downstream. These are examples only.

An operator can install, from the rear of valve pressure vessel 160, valve seat 186, followed by valve 200, then sealing feature 206 (which could be removably disposed on filter 148 such that it can be installed simultaneously with filter 148) and the filter 148. Additional items can be included and can be installed in a similar manner in a variety of orders, for example, but not limited to, spring 203.

In typical spray systems, to access, perform maintenance or replace the valve seat, valve, and/or filter, an operator and/or user can be required to disassemble a substantial portion of the fluid applicator. For example, an operator or user may have to remove/uninstall the fluid delivery line, the handle, as well as other items, before being able to access these various components. This can increase spraying system downtime and can affect the integrity (e.g., sealing integrity) of the system if parts have to be taken off and then reinstalled, as they may be reinstalled incorrectly or may, as a result of additional use (e.g., threading and unthreading), have less structural/seal integrity. Applicator 110 allows an operator and/or user to access, perform maintenance or replace components by removing filter 148, which can be externally accessed and removed with a tool, such as a tip with keying mechanism, or another type of tool.

Figure 7:
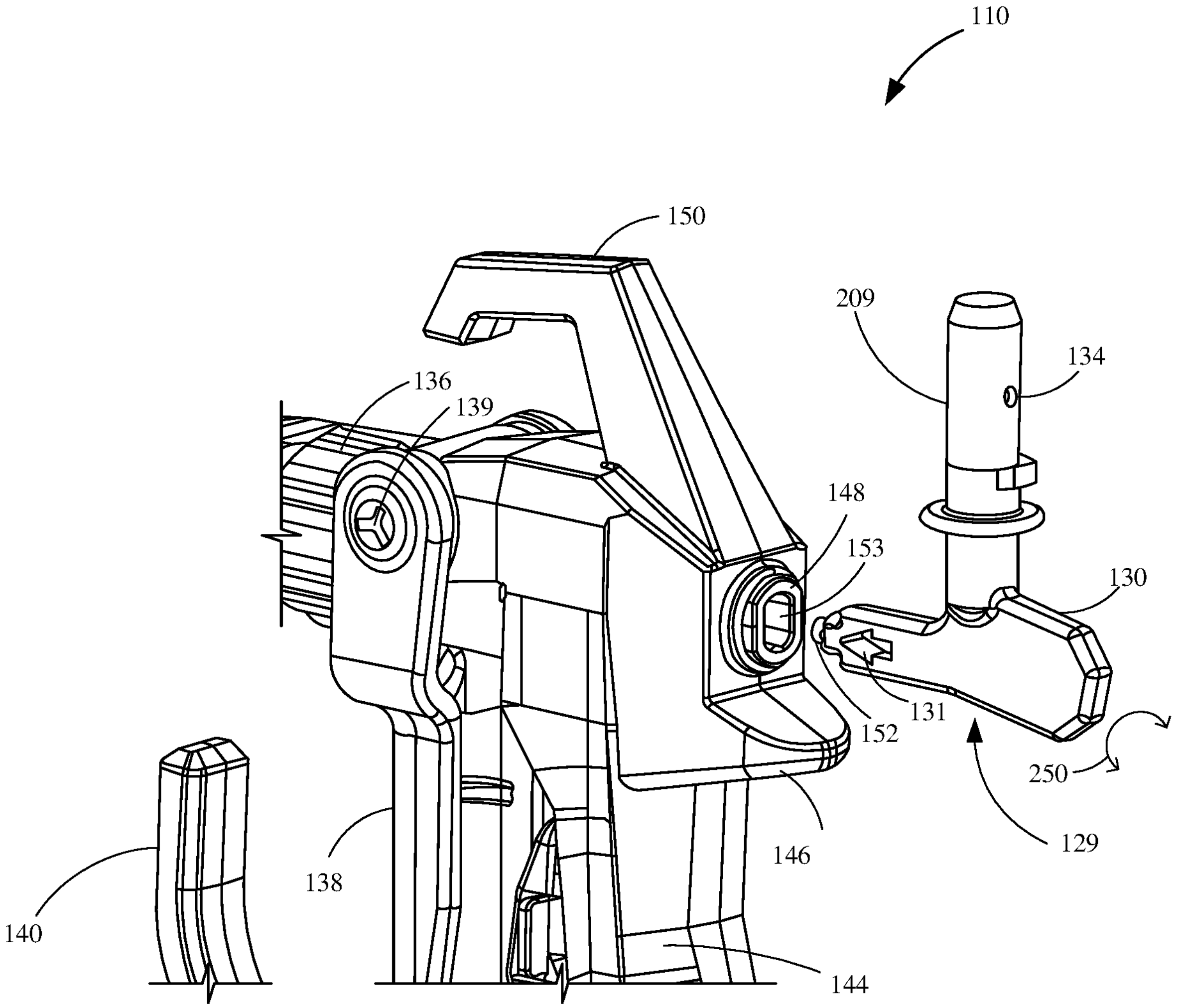
FIG. 7 is a perspective view showing one example fluid applicator.

FIG. 7 is a perspective view showing one example of fluid applicator 110. FIG. 7 shows how mating feature 152 of tip 129 can be used to remove or install filter 148 (e.g., fasten or unfasten) from fluid applicator 110. As illustrated, tip 129 can be removed from applicator 110 (or another tip or tool can be used) and mating feature 152 can be inserted into mating feature 153 of filter 148. Then, in one example, filter 148 can be rotatably moved by applying force to tip 129 in the clockwise or counterclockwise direction, as indicated by arrow 250. Force applied to tip 129 is transferred to a surface of filter 148 which causes filter 148 to move in a corresponding direction. If, for example, filter 148 is threadably coupled to applicator 110, then the force applied will causes filter 148 to screw or unscrew. By requiring, in some examples, tool-removal of filter 148, the integrity of the fluid pathway and applicator 110 is better maintained such that dangerous or harmful situations are reduced or otherwise eliminated, for instance, preventing accidental loosening (such as by an operator's or user's body coming into contact with filter 148) of filter 148 such that the pressurized fluid escapes the interior of applicator 110.

FIG. 8 is as perspective view showing one example of fluid applicator 110. FIG. 8 shows an example of the sealing fit between the tip assembly and pressure vessel 160. More specifically, FIG. 8 illustrates the sealed interface between the tapered surface of recess 189 of pressure vessel 160 and the tapered surface of tip saddle 215. As shown, tip saddle 215 has an upstream portion 252 having a tapered surface that is configured to be received within recess 189 of pressure vessel 160, recess 189 having (as shown in previous FIGS.) a corresponding tapered surface. While not shown in FIG. 8 for illustrative clarity, it is to be understood that attachment mechanism 136 is configured to couple the tip assembly to pressure vessel 160 by mating with mating feature 188. The mating between upstream portion 252 and recess 189 forms a tapered sealed interface directly between the tip assembly and pressure vessel 160. As shown in FIG. 8, hose barb 158 can include one or more barbs or ribs 173. Hose barbs or ribs 173 can provide additional fastening and/or sealing strength between fluid delivery line 106 and hose barb 158. In some examples, such as lower pressure applications, hose barbs or ribs 173 provide sufficient fastening and/or sealing between hose barb 158 and fluid delivery line 106 such that no additional attachment mechanism, such as crimp ferrule 156, is needed.

Figure 9:
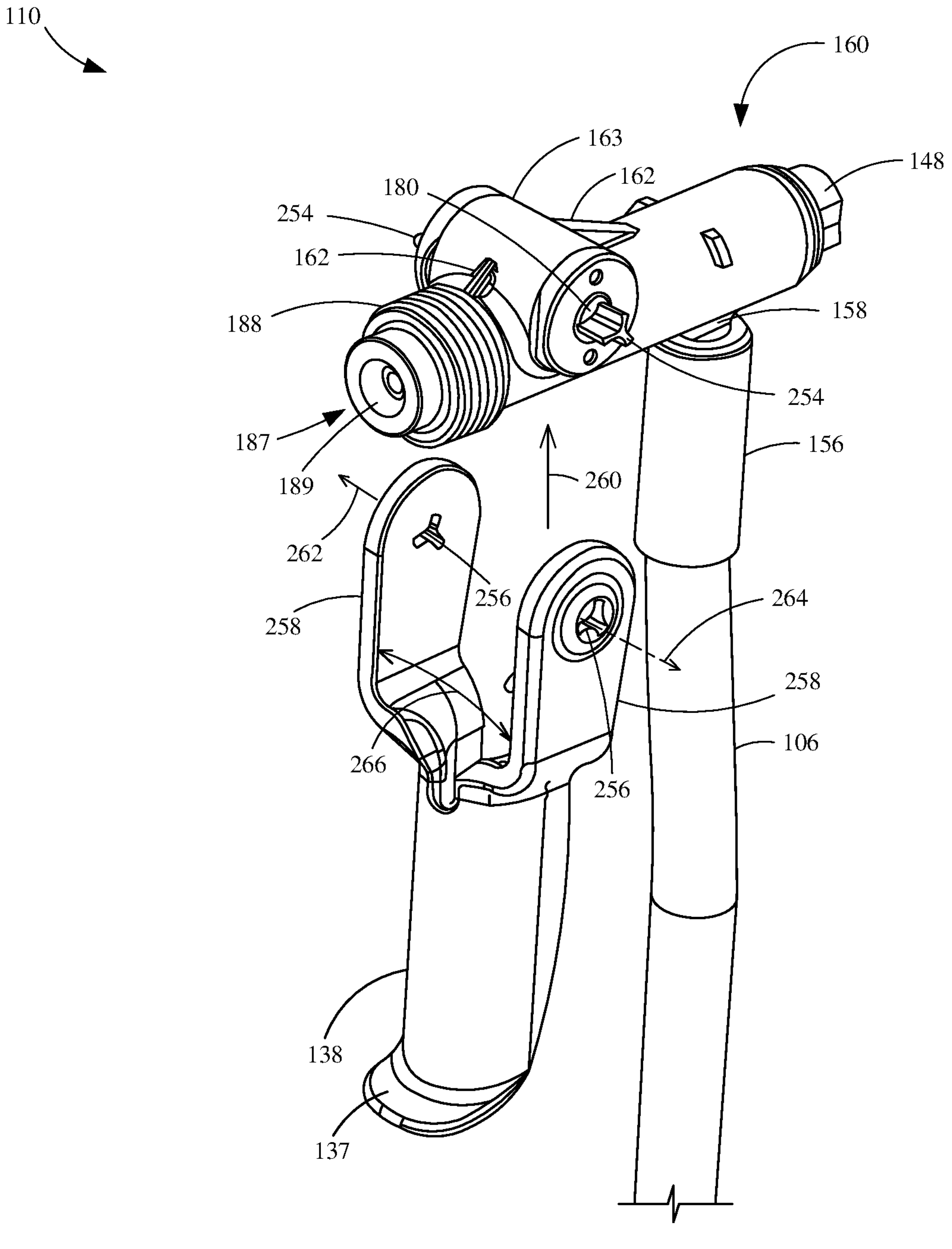
FIG. 9 is a perspective view showing one example fluid applicator.

FIG. 9 is a perspective view showing one example of fluid applicator 110. FIG. 9 shows an example of the coupling between trigger 138 and pressure vessel 160. In addition to the items illustrated in previous Figures, which are numbered similarly, fluid applicator 110 includes mating features 254 and 256 and wings 258. As shown, valve actuation mechanism 180 includes mating features 254 which are configured to be received by corresponding mating features 256 on wings 258 of trigger 138. Trigger 138 is configured to be pivotally mounted to valve pressure vessel 160 such that actuation of trigger 138 causes corresponding actuation (e.g., rotation) of valve actuation mechanism 180.

In one example, trigger 138 can be "snapped" on by an operator and/or user, as indicated by arrows 260 to 264. For example, distance 266 between surfaces of each one of wings 258 can be less than a distance between mating features 254 (e.g. the distance between the end of each one of mating features 254) such that, in order for trigger to "snap" over mating features 254 such that they are received by mating features 256, one or both wings 258 must be separated ("stretched out") such that distance 266 is increased sufficiently for trigger 138 to snap over mating features 254. This is generally indicated by arrows 262 and 264. Trigger 138 can have a preset resistance (and material rigidity) such that it maintains or naturally returns back (e.g., springs) to a position wherein distance 266 is less than a distance between mating features 254 yet can be flexible enough for an operator and/or user to increase distance 266 such that trigger can be rotatably mounted to pressure vessel 160 by the mating of mating features 254 and 256. In one example, an operator's and/or user's hands can be used to increase distance 266.

While FIG. 9 illustratively shows the use of mating features 254 and 256 for the rotatable mounting of trigger 138 and pressure vessel 160, it is to be understood that various other coupling, fastening and/or attachment mechanisms can be used.

Figure 10:
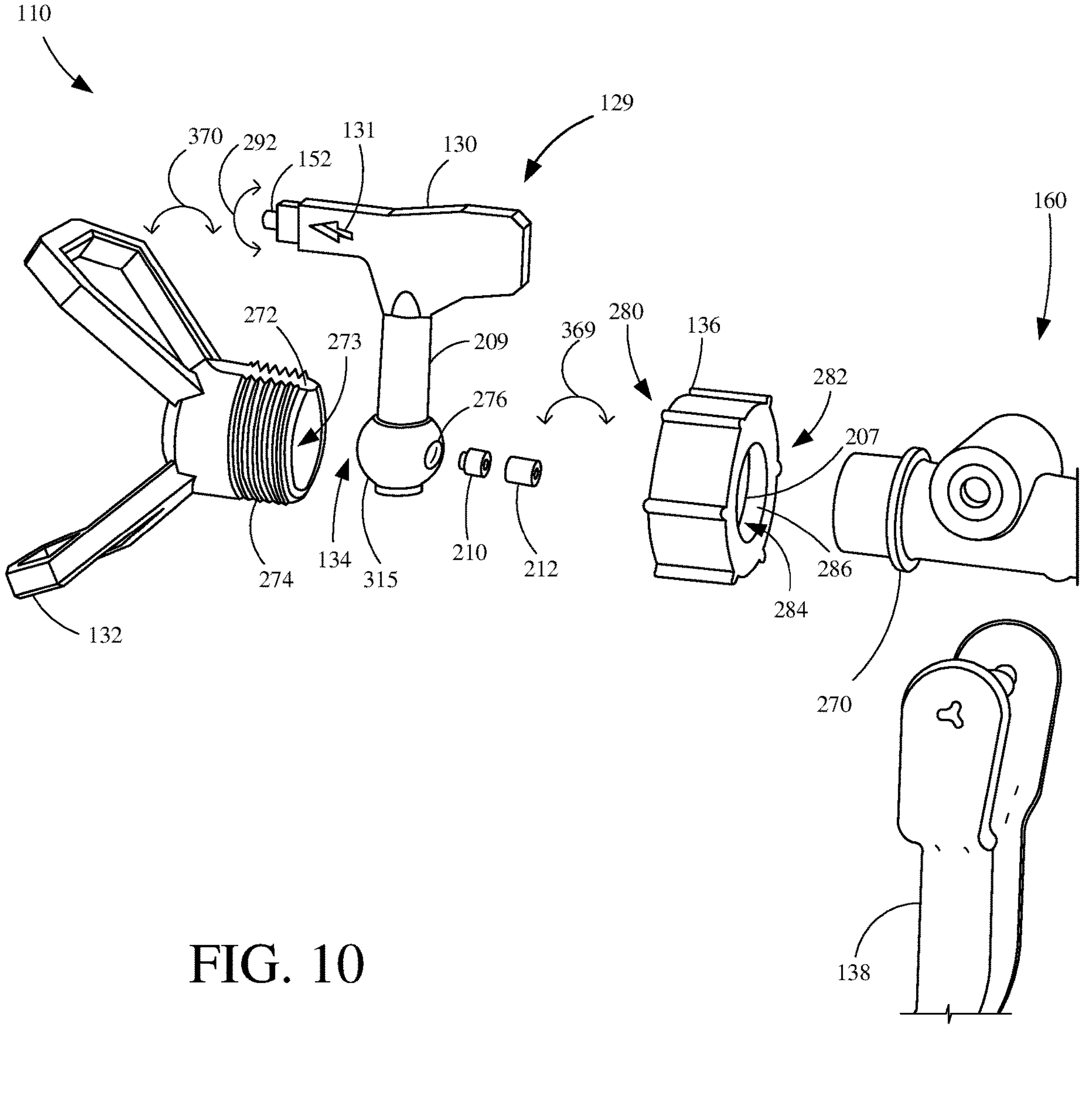
FIG. 10 is a perspective view showing one example fluid applicator.

FIG. 10 is a perspective view showing one example of fluid applicator 110. FIG. 10 shows an alternative example of the tip assembly and the coupling of the tip assembly to valve pressure vessel 160. In addition to the features shown in previous Figures, which are numbered similarly, fluid applicator 110 includes coupling feature 270, slot 272, recess 273, coupling feature 274, tip inlet 276, downstream portion 280, upstream portion 282, aperture 284, upstream surface 286 and tip saddle 315.

As shown, FIG. 10 illustrates tip 129 having a spherical tip saddle 315. Tip saddle 315 has an aperture therethrough configured to receive a portion of tip body 209 such that tip saddle 315 is coupled (e.g., slidably) to tip body 209. Tip saddle 315 includes an inlet 276 and an outlet 134 that define a fluid pathway from pressure vessel 160 through and out of the tip assembly. Proper alignment of tip saddle 315 and tip body 209 can be indicated by alignment of inlet 276 and an outlet of tip saddle 315 with a corresponding inlet and outlet of tip body 209. Inlet 276 is configured to receive tip piece 210 and pre-orifice piece 212. In one example, tip piece 210 and/or pre-orifice piece 212 are configured to be press fit in to inlet 276 (such as by hand).

Outlet guard 132 includes slot 272 and recess 273. Slot 272 is configured to receive a corresponding portion of tip body 209, while recess 273 is configured to receive a corresponding portion of tip body 209 and/or tip saddle 315. Tip saddle 315 is configured to be received by or otherwise engage downstream portion 280 of attachment mechanism 136 and can be within aperture 284. This creates a spherical sealed interface between attachment mechanism 136 and the tip assembly. Additionally, when coupled to pressure vessel 160, tip saddle 315 can be received by recess 189 and a spherical sealed interface can be formed between tip saddle 315 and recess 189. Outlet guard 132 is configured to be coupled to attachment mechanism 136 (and thereby valve pressure vessel 160) by coupling or otherwise fastening coupling feature 274 of outlet guard 132 to coupling feature 207 of attachment mechanism 136. While FIG. 10 illustratively shows coupling features 207 and 274 as threads, any other suitable coupling mechanism and/or techniques could be used.

As illustrated, coupling feature 207 does not extend the entire length of the inner surface of attachment mechanism 136. This is because, in one example, attachment mechanism 136 includes an upstream surface 286 that is configured to slide over coupling feature 270 of valve pressure vessel 160. Attachment mechanism 136, once upstream surface 286 is over coupling feature 270, can be crimped onto valve pressure vessel 160, wherein coupling feature 270 (illustratively shown as a rib or shoulder) acts to substantially prevent forward motion of attachment mechanism 136, such that attachment mechanism 136 is secured to valve pressure vessel 160. Additionally, while coupling feature 270 substantially prevents forward motion of attachment mechanism 136 (once crimped or otherwise coupled) it also allows rotational movement (as indicated by arrow 369) of attachment mechanism 136 such that it can be coupled to and uncoupled from (e.g., threaded and unthreaded) coupling feature 274 of outlet guard 132.

Attachment mechanism 136 can include additional features (e.g., ribs) that can increase the integrity (e.g., hold strength, grip strength, etc.) of the coupling between attachment mechanism 136 and valve pressure vessel 160.

By virtue of the fit between tip 129 and outlet guard 132, and the spherical surface of tip saddle 315, tip 129 is provided freedom of movement (e.g., rotational movement) in various directions, for instance, tip 129 can be rotated 360° clockwise or counterclockwise (as indicated by arrow 370). For example, an operator and/or user can rotate tip 129 180° such that outlet 134 is facing pressure vessel 160. In this way, pressurized fluid can be conveyed through tip 129 in an outlet 134 to inlet 276 (i.e., the reverse of the normal operating) direction. This can be particularly useful for clearing out the fluid pathway of tip 129, for instance, clearing obstructions that can form in the fluid pathway (e.g., proximate outlet 134). Additionally, an operator and/or user can rotate tip 129 clockwise and or counterclockwise to a degree (e.g., 900 in either direction) wherein the fluid pathway of tip 129 is no longer in fluidic communication with the fluid source such that the applicator is prevented from applying fluid to a surface.

Furthermore, tip 129 can be tilted in an upstream or downstream direction (as indicated by arrow 292). This can allow for variability and control of the spraying direction and/or angle of the fluid exiting outlet 134 without having to manually hold the gun at the desired angle or point the gun in the desired direction. This can reduce operator and/or user fatigue, make the operation and/or use of fluid applicator easier and more dynamic, and allow for application of fluid to surfaces positioned at various locations relative to the operator and/or user.

The upstream or downstream movement of tip 129 is, in one example, only limited by the physical design of fluid applicator, for example the downstream tilt limit can be defined by the dimensions of slot 272 and the dimensions of the stem (e.g., tip body 209) and/or flag 130 of tip 129. Similarly, the upstream movement of tip 129 can have a tilt limit defined by the dimensions of other components of fluid applicator (e.g., pressure vessel 160) as well as the dimensions of the stem (e.g., tip body 209) and/or flag 130 of tip 129. However, the dimensionality of fluid applicator can be varied by design such that tip 129 is capable of moving within desired ranges. For instance, tip 129 can rotate 90° in the upstream and/or downstream direction as well as to various intermediate positions therebetween. This can, among other things, provide an alternative freedom of movement to inhibit fluidic communication between the fluid source and tip 129 such that fluid applicator 110 is prevented from applying fluid to a surface.

Figure 11:
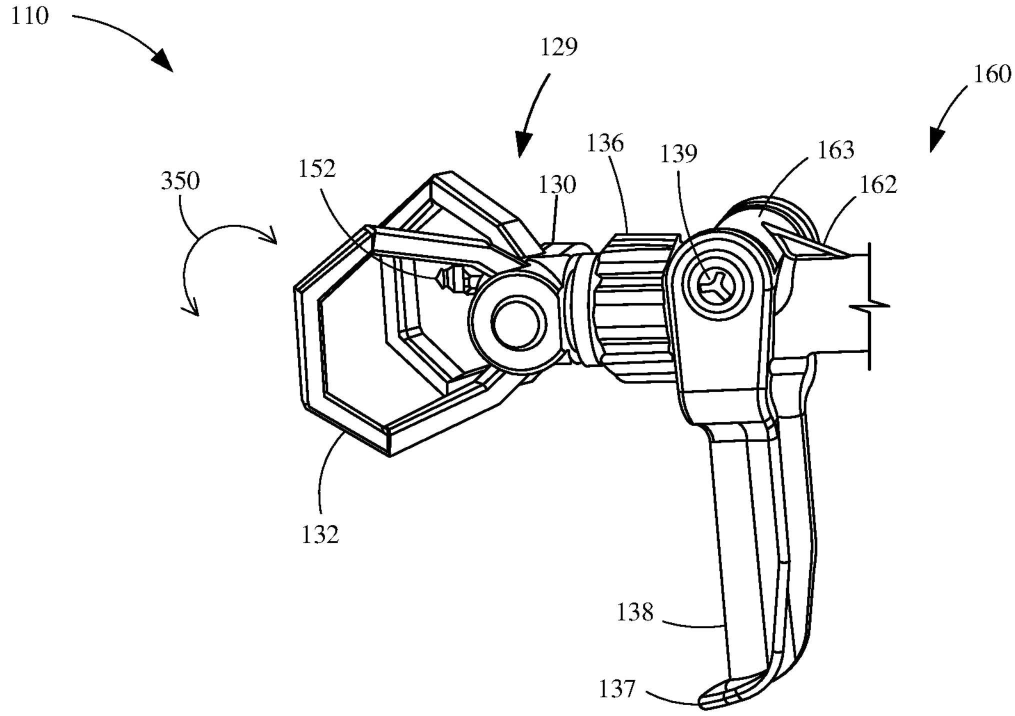
FIG. 11 is a perspective view showing one example fluid applicator.

FIG. 11 is a perspective view showing one example fluid applicator 110. FIG. 11 shows an example of fluid applicator 110 wherein the tip assembly can be rotated, such as by rotational movement of outlet guard 132. For example, outlet guard 132 can be rotated in the clockwise or counterclockwise direction, as indicated by arrow 350, to change a characteristic of the fluid exiting outlet 134 (e.g., a spray characteristic), for instance by threading or unthreading feature 274 with coupling feature 207 of attachment mechanism 136. In another example, attachment mechanism 136 can also be rotated in a clockwise or counterclockwise direction to change a characteristic of the fluid exiting outlet 134 (e.g., a spray characteristic). In some examples, the fluid exits outlet 134 in a "fan" spray pattern. By rotating the tip 129 from flag vertical position (as shown in FIG. 10) to a flag horizontal position (as shown in FIG. 11), the fan pattern can be better suited for horizontal application (i.e., spraying from left-to-right/right-to-left rather than up and down).

Figure 12:
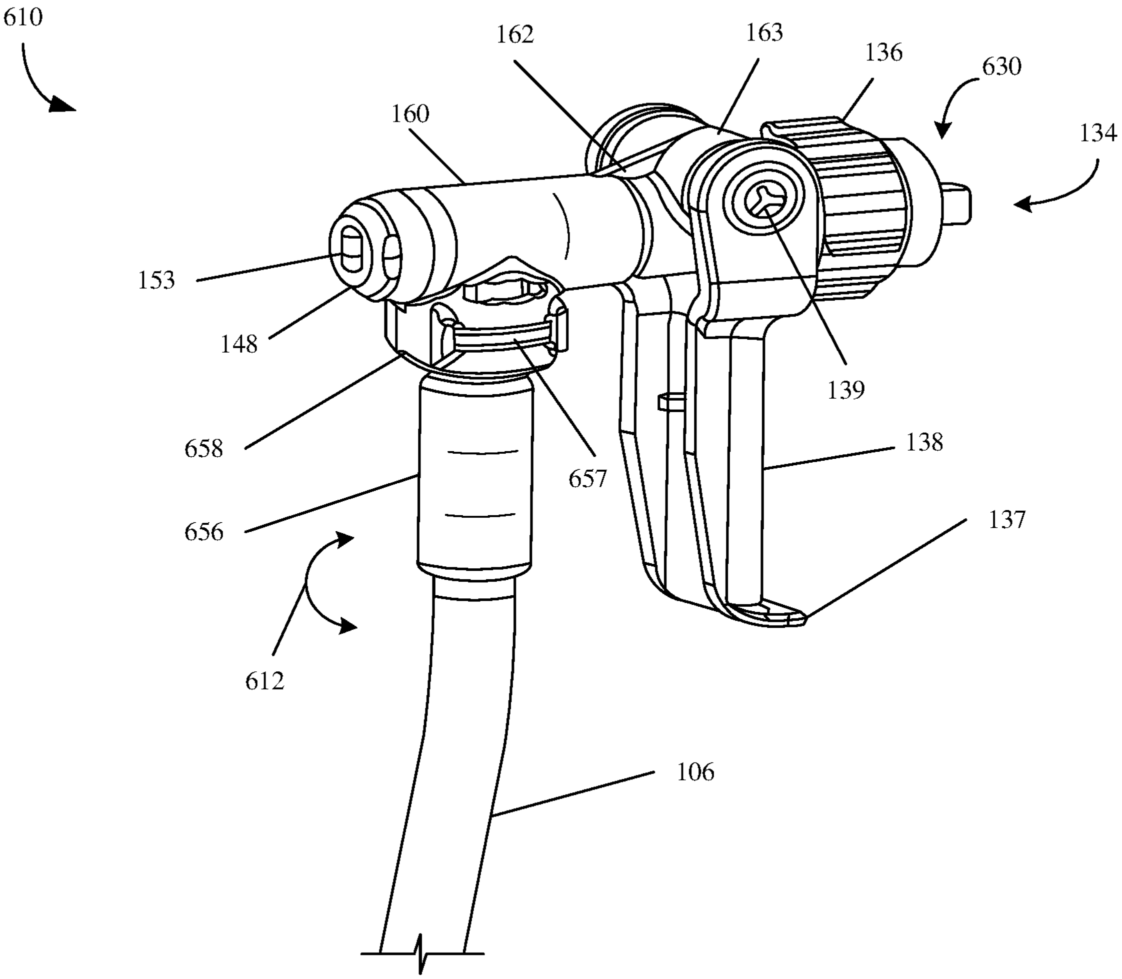
FIG. 12 is a perspective view showing one example fluid applicator.

FIG. 12 is a perspective view showing one example fluid applicator 610. Fluid applicator 610 is similar to fluid applicator 110 and thus similar parts are numbered the same. As illustrated in FIG. 12, fluid applicator 610 differs from fluid applicator 610 in that pressure vessel 160 includes a different integrated (e.g., molded as part of, forms or is a part of the body of pressure vessel 160) fluid delivery line fitting 658 as compared to hose barb 158 of fluid applicator 110. Additionally, as illustrated, fluid applicator 610 is shown having a tip 630, which differs from tip 129. It should be noted, however, that fluid applicator 610 can have a variety of tips, including, in some examples, tip 129 or a tip similar to tip 129. It should be noted that fluid applicator 610, similar to fluid applicator 110, can be a part of a fluid applicator system, such as fluid applicator system 100 shown in FIG. 1, or another type of fluid applicator system. Additionally, fluid applicator 610 includes a fluid delivery line attachment mechanism 656 (illustratively shown and referred to as crimp ferrule 656) which retains an insert 667 (shown in FIGS. 13-14) within fluid delivery line 106. Fluid applicator 610 also includes a retaining clip 657 (shown in more detail in FIG. 13) that retains insert 667 (shown in FIG. 13) within fluid delivery line fitting 658 to couple fluid delivery line 106 to fluid delivery line fitting 658 and thus pressure vessel 160. Fluid delivery line fitting 658 and retaining clip 657 allow fluid delivery line 106 to rotate, as indicated by arrow 612, while coupled to fluid delivery line fitting 658 and pressure vessel 160. This provides improved freedom of movement and use of fluid applicator 610, for example, with other types of fluid delivery line fittings, as a user and/or operator of the fluid applicator rotates the fluid applicator, the fluid delivery line, generally being rotationally secured, also rotates. In such instances, the fluid delivery line can itself twist or kink which can affect the delivery of fluid therethrough as well as provide resistance to the free movement of the fluid applicator. In contrast, as an operator and/or user of fluid applicator 610 rotates fluid applicator 610, insert 667, and thus fluid delivery line 106, can rotate within fluid delivery line fitting 658 (or fluid delivery line fitting 658 can rotate about insert 667) such that fluid delivery line 106 does not twist or kink during rotation of fluid applicator 610.

Figure 13:
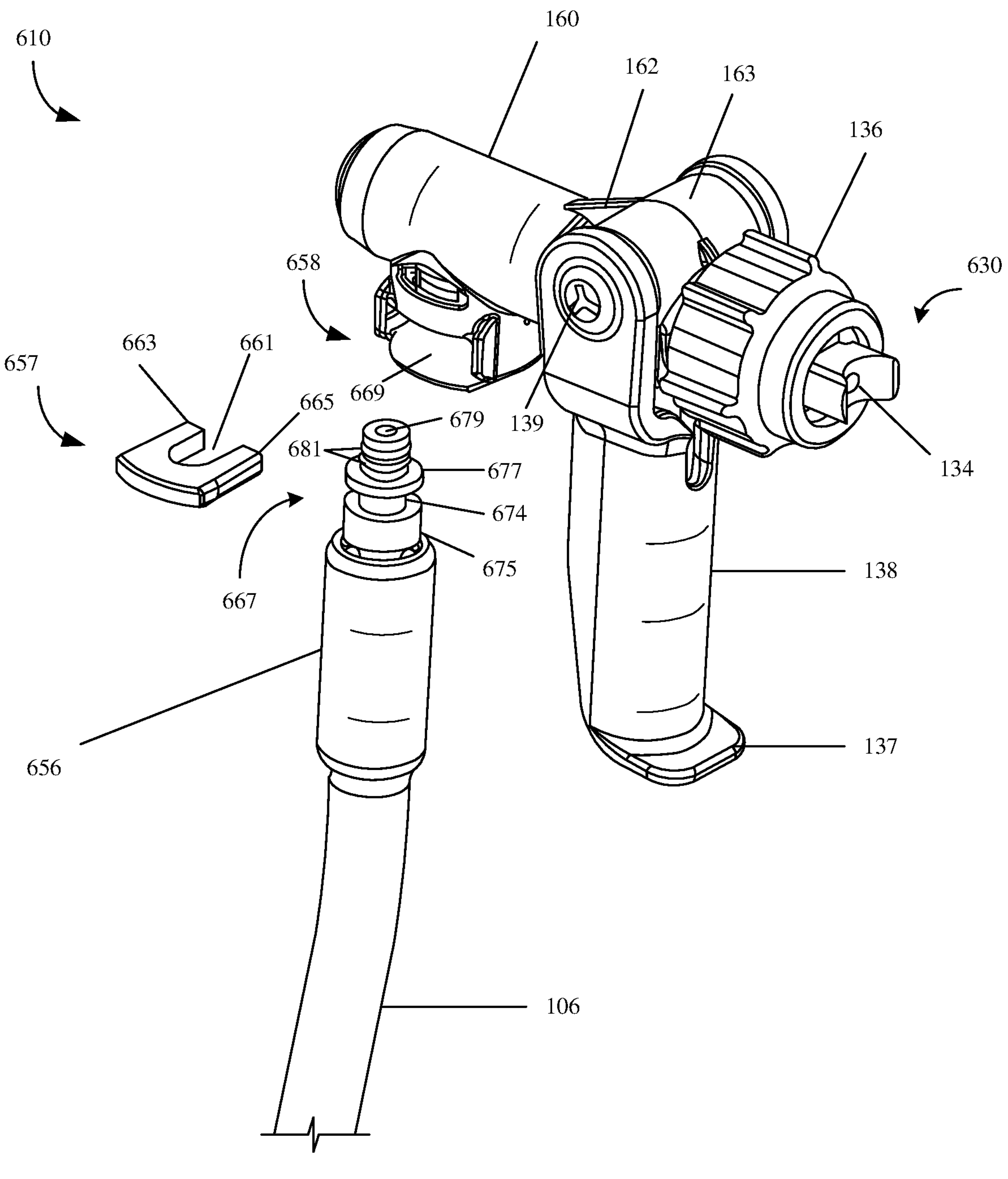
FIG. 13 is a partial exploded view showing one example fluid applicator.

FIG. 13 is a partial exploded view showing one example fluid applicator 610. In FIG. 13, retaining clip 657 and insert 667 are shown in more detail. Insert 667, which is disposed within a portion of fluid delivery line 106 (as is shown in more detail in FIG. 14) and is retained within fluid delivery line 106 by crimp ferrule 656, includes neck 674, shoulder 675, shoulder 677, outlet 679, and one or more sealing element(s) 681 (such as one or more O-rings). Retaining clip 657 includes recess 661, left portion 663, and right portion 665. Recess 661 is configured to receive neck 674 of insert 667 such that left portion 663 and right portion 665 fit around neck 674. In one example, insert 667 is inserted into an aperture (shown in FIG. 14) disposed at the bottom (or on a bottom side) of fitting 658 and retaining clip 657 is inserted into an aperture or recess disposed on a side (e.g., left side and/or right side) of fluid delivery line fitting 658. Fitting 658 can include a retaining feature 669 (in which the aperture, of fitting 658, that insert 667 is inserted into is formed). The retaining feature 669 includes a top surface (shown) which acts as a wall or shoulder to prevent axial movement or uncoupling of insert 667, and thus fluid delivery line 106, when retaining clip 657 is installed. Shoulders 675 and 677 have a greater diameter (e.g., cross-sectional width) than neck 674 and define proper alignment between insert 667 and retaining clip 657 for coupling insert 667 to fitting 658 and also prevent or limit uncoupling and/or axial movement of fluid delivery line 106 and insert 667 when coupled to fitting 658. In one example, retaining clip 657 is formed of a flexible material (e.g., polymer, metal, etc.) such that it naturally retains its shape (as shown in FIG. 13) but is flexible enough such that retaining clip 657 (or one or more portion(s) thereof, such as left portion 663 and/or right portion 665) can widen, such as when pressed against insert 667, to allow neck 674 into recess 661 and narrow by virtue of the biasing (e.g., spring) of the material back to its natural shape.

Retaining clip 657 can allow for quick coupling and uncoupling between fluid delivery line 106 and fitting 658, such as for the purpose of maintenance, swapping out parts, or installing, for example, a new fluid delivery line.

Sealing elements 681 provide a seal between insert 667 and an inner wall of pressure vessel 160 to prevent or limit the backflow of fluid out of fluid applicator 610. While more than one sealing element 681 is shown, it should be understood that in other examples, insert 667 can include more or less sealing elements 681, such as one or more sealing elements 681. Pressurized fluid is conveyed along fluid delivery line 106, such as by a pump assembly to which fluid delivery line 106 is fluidically coupled, through outlet 679 of fitting 667 and into pressure vessel 160.

Figure 14:
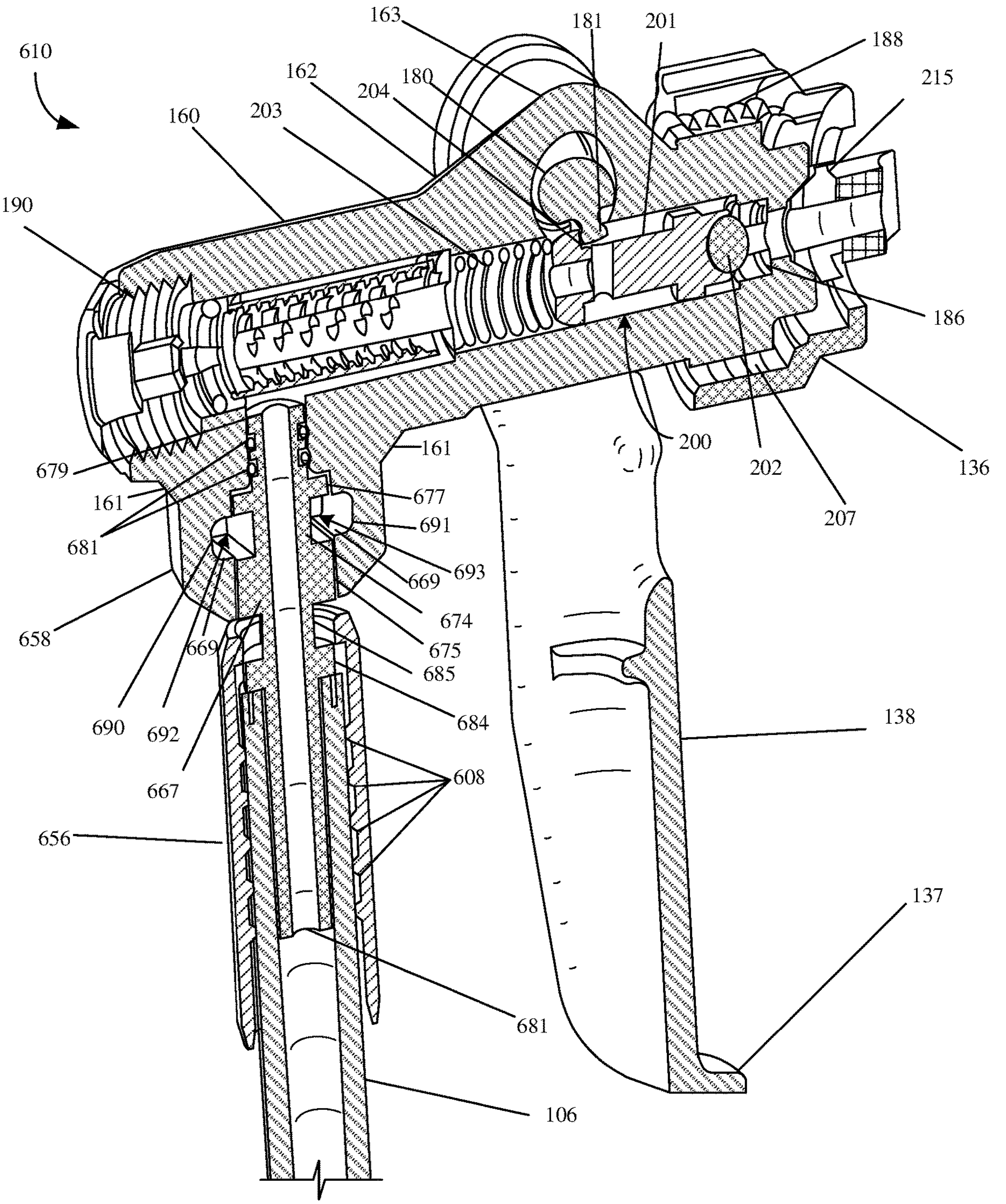
FIG. 14 is a cross-sectional view showing one example fluid applicator.

FIG. 14 is a cross-sectional view showing one example of fluid applicator 610. FIG. 14 illustrates some items of fluid applicator 610 in more detail. As shown in FIG. 14, crimp ferrule 656 comprises one or more ribs 608 which provide additional fastening and/or sealing strength (e.g., extra grip, hold strength, such as by digging into fluid delivery line 106, etc.), to the crimp between fluid delivery line 106 and insert 667. Insert 667 includes a rib 684 and an inlet 681. Inlet 681 is configured to receive fluid from fluid delivery line 106, which then passes through insert 667 out of outlet 679 to pressure vessel 160. Rib 684 provides proper alignment between insert 667 and fluid delivery line 106 (e.g., depth of insert 667 within fluid delivery line 106). Further, as shown in FIG. 14, insert 667 includes a neck 685. Neck 685 has a smaller diameter (e.g., cross-sectional width) than both rib 684 and shoulder 675, and the space between rib 685 and shoulder 675 defines a recess in which a portion of crimp ferrule 656 is received and can fit over a top surface of rib 684. This can provide proper alignment between crimp ferrule 656 and insert 667 and increase the fastening and/or sealing between fluid delivery line 106 and insert 667. In some examples, insert 667 could include one or more ribs or barbs, such as disposed on the portion of insert 667 configured to be disposed in fluid delivery line 106, instead of or in addition to ribs 608 of crimp ferrule 656. These one or more barbs or ribs of the insert could increase the strength of coupling and/or seal between fluid delivery line 106 and insert 667.

As shown in FIG. 14, fluid delivery line fitting 658 further includes a left recess 690 and a right recess 691 formed (e.g., during the manufacture of fitting 658, such as during molding) in the body of fitting 658. When properly aligned (as shown in FIG. 14) neck 674 of insert 667 and recesses 690 and 691 of fitting 658 define a left recess 692 (between neck 674 and left recess 690) and a right recess 693 (between neck 674 and right recess 691). Left recess 692 and right recess 693 are configured to receive left portion 663 and right portion 665 of retaining clip 657, respectively, while neck 674 is received by recess 661 of retaining clip 657. In one example left recess 692 and right recess 693 extend through fitting 658 (as shown). In this way, retaining clip 657 can be inserted from multiple sides (e.g., left side and right side) of fitting 658. Additionally, in such examples, the retaining clip 657, when installed to couple insert 667, and thus fluid delivery line 106, to fitting 658, can be accessed from multiple sides of fitting 658. In another example, left recess 692 and right recess 693 extend only partially into fitting 658.

While not shown in FIGS. 12-14, it should be understood that fluid applicator 610 can include a handle assembly configured to fit over various components of fluid applicator 610. In one example, fluid applicator 610 includes the handle assembly shown in previous FIGS. herein (such as FIGS. 2-3) including handle portion halves 172. In other examples, fluid applicator 610 can include a different handle assembly having various features and components.

Figure 15:
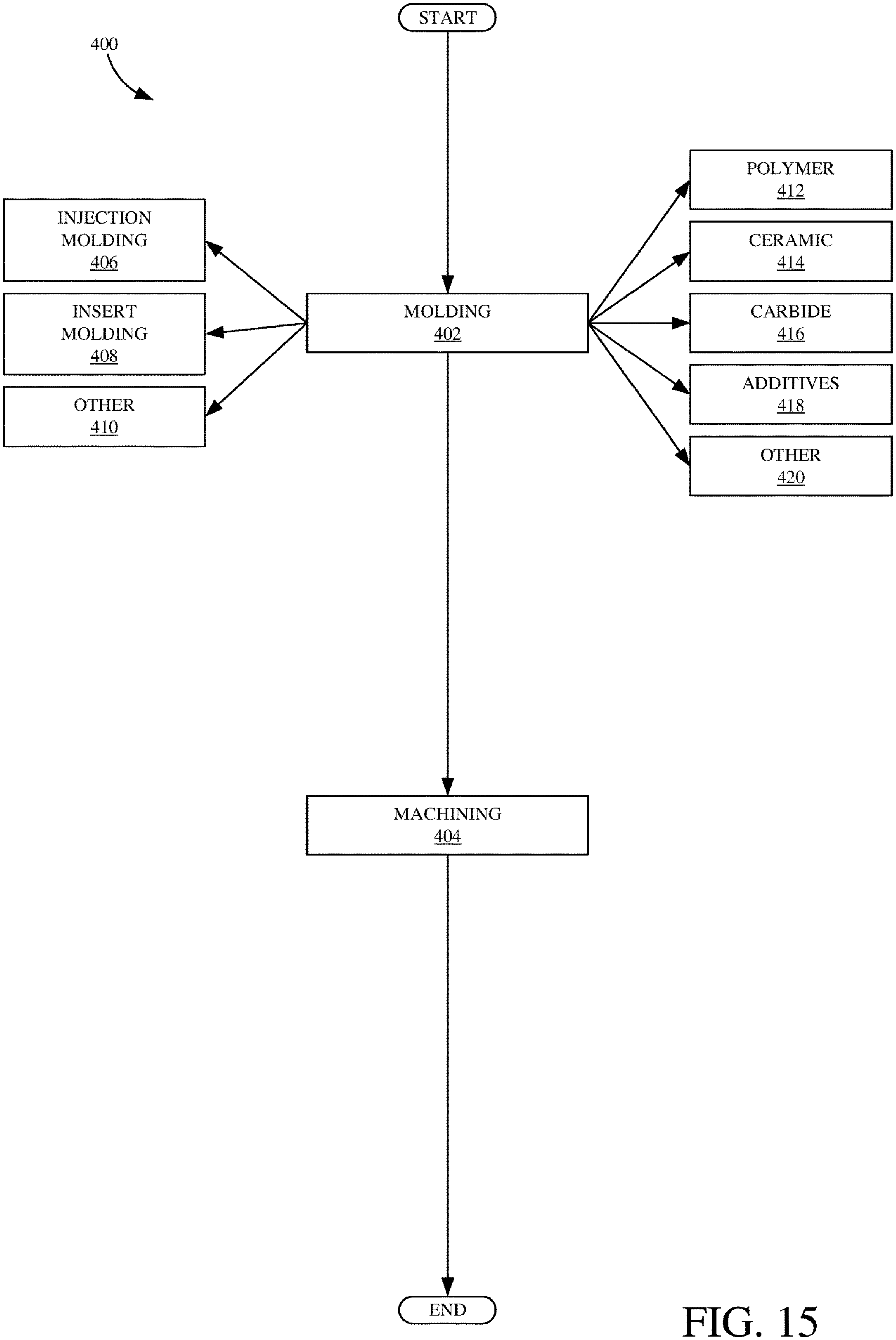
FIG. 15 is a flow diagram showing an example method of manufacturing a fluid applicator.

FIG. 15 is a flow chart showing one example of manufacturing a fluid applicator, such as fluid applicator 110 and/or 610, and/or components thereof. Method 400 begins at block 402 where all or various items and/or features of fluid applicator 110 and/or 610 are molded. The various items and/or features of fluid applicator 110 and/or 610 can be injection molded, as indicated by block 406. The various items and/or features of fluid applicator 110 and/or 610 can be insert molded, as indicated by block 408. The various items and/or features of fluid applicator 110 and/or 610 can be molded using various other molding techniques, as indicated by block 410.

The various items and/or features of fluid applicator 110 and/or 610 can be formed of (entirely or partially) various polymers (such as plastic, nylon, for instance glass-filled nylon), as indicated by block 412. The various items and/or features of fluid applicator 110 and/or 610 can be formed of (entirely or partially) ceramic, as indicated by block 414. The various items and/or features of fluid applicator 110 and/or 610 can be formed of (entirely or partially) carbide, as indicated by block 416. The various items and/or features of fluid applicator 110 and/or 610 can include an additive, as indicated by block 418. For example, the various items and/or features can include an anti-static additive(s). The anti-static additives, particularly in examples where the items and/or features of fluid applicator 110 and/or 610 are formed of polymers (such as plastics, nylon, etc.), can reduce or eliminate static issues such as dust attraction or electrostatic discharge (ESD). For example, the incorporation of an anti-static additive into fluid applicator 110 and/or 610, or components thereof, can provide an electrical path from the pump to the tip to dissipate ESD.

The fluid being applied by fluid applicator 110 and/or 610 may be flammable. A buildup of static electricity could, therefore, cause combustion or an explosion. Additionally, fluid applicators, such as fluid applicator 110 and/or 610, can be used in environments (e.g., industrial facilities, construction sites, etc.) where dust and other debris may be present. The attraction of dust and other debris can by a hygienic issue for the operator and/or user as well as deteriorate fluid applicator 110 and/or 610. Additionally, dust can be flammable, and thus attraction of dust to a fluid applicator where a buildup of static electricity is present can cause combustion or an explosion. The additive at block 418 can be external (e.g., applied topically, such as by coating) and/or internal (e.g., incorporated into the molding material).

Method 400 proceeds at block 404 where the various items and/or features can of fluid applicator 110 and/or 610 can be machined. It should be understood that the various items and/or features of fluid applicator 110 and/or 610 can be entirely formed by the molding process at block 402, and thus machining is not required. In other examples, however, certain items and/or features can be machined into fluid applicator 110 and/or 610. For example, mating features, coupling features, apertures, holes, cavities, inner diameters, etc., can be machined into fluid applicator 110 and/or 610. By way of illustration, but not by limitation, one or more of the various coupling features (e.g., threads) on fluid applicator 110 and/or 610, can be machined.

Figure 16:
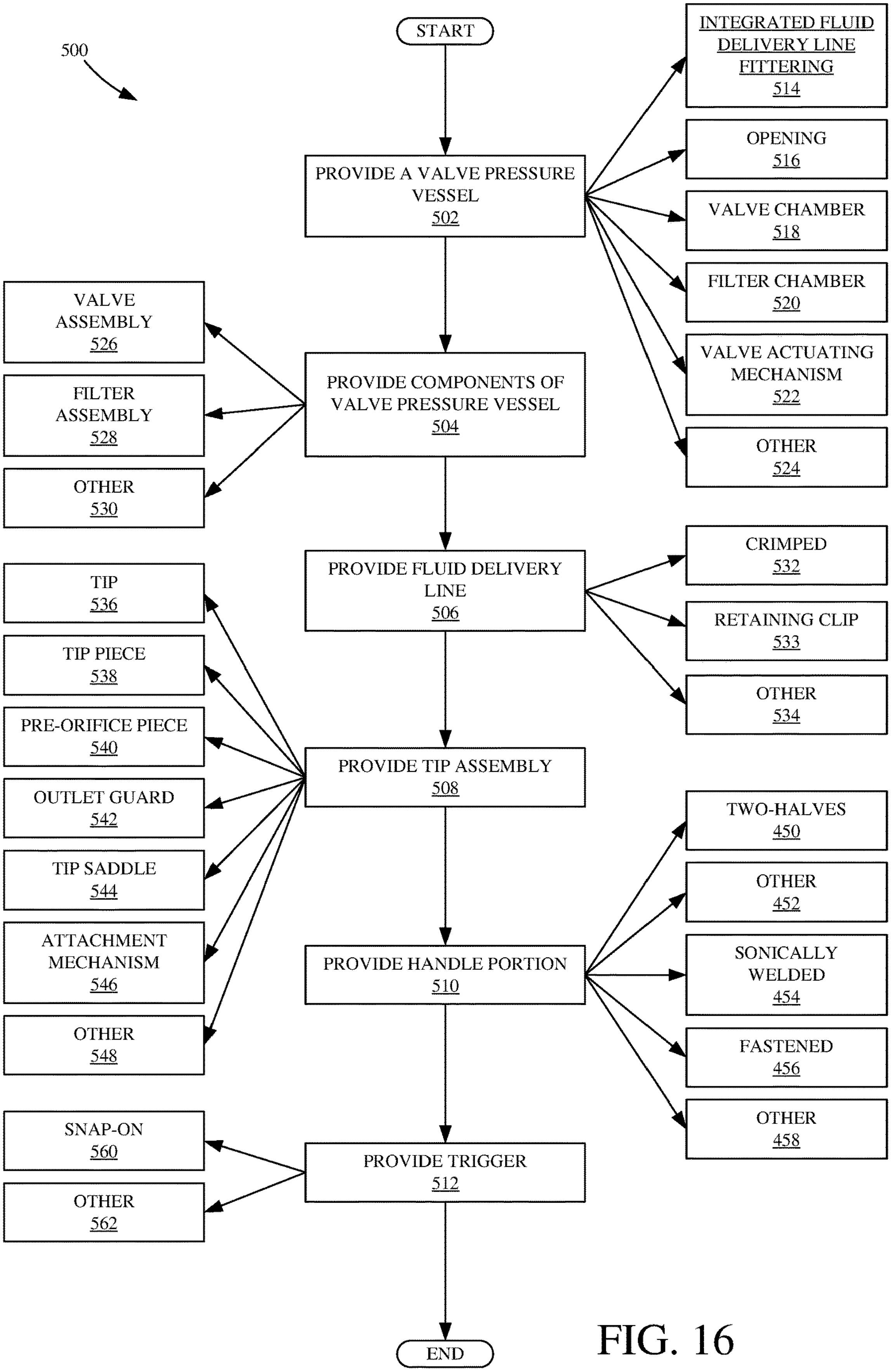
FIG. 16 is a flow diagram showing an example method of assembling a fluid applicator.

FIG. 16 is a flow chart showing one example method of assembling fluid applicator 110 and/or 610 and/or components thereof. Method 500 begins at block 502 where a valve pressure vessel is provided. The valve pressure vessel can include an integrated fluid delivery line fitting, as indicated by block 514. The integrated fluid delivery line fitting is an integrated component of the valve pressure vessel, for example, is molded as a part of the valve pressure vessel. The valve pressure vessel can include an opening, as indicated by block 516. The opening can be on an end (e.g., upstream end, opposite end of tip assembly) of the valve pressure vessel and can be configured to provide access to an interior of the valve pressure vessel. The valve pressure vessel can include a valve chamber, as indicated by block 518. The valve chamber is defined by inner diameter of the valve pressure vessel and is configured to receive a valve assembly (such as valve 200). The valve pressure vessel can include a filter chamber, as indicated by block 520. The filter chamber is defined by an inner diameter of the valve pressure vessel and is configured to receive a filter assembly (such as filter 148). The valve pressure vessel can include a valve actuating mechanism, as indicated by block 522. The valve actuating mechanism can include items on an interior of the valve pressure vessel (such as protrusion 181) as well as items on an exterior of valve pressure vessel (such as mating features 254). The valve pressure vessel can include other items and features as well, including those described herein, for example, but not limited to, surfaces, recesses, diameters, coupling features, mating features, support structures, mounting mechanisms, as well as various other items.

It should be understood that at block 502, the valve seat can be provided as part of the molded body of valve pressure vessel, for example, an insert molded valve seat, which can, in some examples, be formed of a different material than the valve pressure vessel or components thereof. Additionally, the valve pressure vessel can include additional features such as shoulder(s) configured to retain the insert molded valve seat. The shoulders can be formed during the molding process (e.g., over-molding).

Method 500 proceeds at block 504 where internal components of the valve pressure vessel are provided into an interior of the valve pressure vessel. The internal components can be provided (e.g., installed) into an opening on the rear (e.g., upstream end) of the valve pressure vessel. Internal components can include a valve assembly, as indicated by block 526. The valve assembly can include a valve seat which can be a separate piece of fluid applicator 510 that is installed into and received by a corresponding structure within the interior of the valve pressure vessel. Alternatively, the valve seat can be an integrated component of the valve pressure vessel, for example, is molded (e.g., insert molded) as part of the valve pressure vessel (as described above). The valve assembly can include a valve, which can further include, amongst various other items and/or features, a valve seat stem configured to be seated in the valve seat and a valve shoulder, disposed on or formed as part of a valve drive stem and configured to be acted against by a valve actuating mechanism for operably moving the valve from a seated to unseated position. The valve is configured to be installed into and received by the valve chamber of the valve pressure vessel. Further, the valve assembly can include a spring which biases the valve to a closed (e.g., seated) position and against which the valve acts when actuated by the valve actuating mechanism.

The internal components at block 504 can further include a filter assembly, as indicated by block 528. The filter assembly can be installed into a filter chamber of the valve pressure vessel, upstream of and coaxial with the valve assembly. The filter assembly can include a filter which is configured to receive the pressurized fluid and filter out unwanted items (e.g., contaminants) therein. The filter assembly can further include, amongst various other items and/or features, coupling features configured to couple the filter to the valve pressure vessel, sealing features, as well as a keying mechanism configured to receive a corresponding keying mechanism for a tooled installation and/or removal of the filter. The internal components at block 504 can include various other items as well, as indicated by block 530.

Method 500 proceeds at block 506 where a fluid delivery line is provided. The fluid delivery line at block 506 is configured to provide a pathway for pressurized fluid from a fluid source to the valve pressure vessel. The fluid delivery line can be directly coupled to the valve pressure vessel. For example, the fluid delivery line can be crimped directly to the integrated fluid delivery line fitting of the valve pressure vessel, as indicated by block 532. In other examples, the fluid delivery line can include an insert coupled to and disposed within the fluid delivery line, the insert (and thus the fluid delivery line coupled thereto) can be coupled to the valve pressure vessel, such as by a retaining clip that fastens the insert (and thus the fluid delivery line coupled thereto) directly to the integrated fluid delivery line fitting of the valve pressure vessel. The fluid delivery line can be coupled to the valve pressure vessel in various other ways as well, as indicated by block 534.

Method 500 proceeds at block 508 where a tip assembly is provided. The tip assembly can include a tip, as indicated by block 536. The tip can include, amongst various other items and/or features, a flag and a tip body (such as a stem), indicators, keying mechanisms, inlets and/or outlets, etc. The tip assembly can further include a tip piece and a pre-orifice piece as indicated by blocks 538 and 540, respectively. The tip piece and pre-orifice piece are configured to be fit (such as press fit) within an interior of the tip and are configured to form a turbulence chamber and define a fluid pathway out of fluid applicator 110 and/or 610 such that the pressurized fluid can be applied to a surface or other application area.

The tip assembly at block 508 can further include an outlet guard, as indicated by block 542. The outlet guard can be configured to receive a portion of the tip (such as within a slot, an opening, a recess, an aperture, etc.) and prevent contact between the fluid exiting an outlet of the tip assembly and a surface (such as a wall, a user's hand, etc.). The outlet guard can further include, amongst various other items and/or features, a coupling feature configured to allow coupling between the tip assembly and the valve pressure vessel.

The tip assembly at block 508 can further include a tip saddle, as indicated by block 544. The tip saddle is configured to receive a portion of the tip and provide a sealing interface between the tip assembly and the valve pressure vessel. For example, the tip saddle can include a portion configured to be received by the valve pressure vessel (such as in a recess of the valve pressure vessel). This portion of the tip saddle can be tapered, spherical, as well as various other shapes, and creates, upon reception by the valve pressure vessel, a sealed interface between the tip assembly and the valve pressure vessel. In addition, the tip saddle has an interior that defines a fluid pathway from the valve pressure vessel to other items of the tip assembly, for instance, the pre-orifice piece.

The tip assembly at block 508 can further include an attachment mechanism, as indicate by block 546. The attachment mechanism is configured to couple the tip assembly to the valve pressure vessel. In one example, the attachment mechanism can include mating features (e.g., threads) configured to mate with corresponding mating features on both or either of the outlet guard or the valve pressure vessel. In another example, the attachment mechanism can include an upstream portion that is configured to fit over a coupling feature (such as a shoulder) of the valve pressure vessel and be crimped directly to the valve pressure vessel. This crimping can be such that the attachment mechanism is still capable of rotational movement such that it can be, for example, threaded or unthreaded, on the downstream portion, to the outlet guard. The tip assembly can include various other items and/or features, as indicated by block 548.

Method 500 proceeds at block 510 where a handle portion is provided. The handle portion is configured to fit over or otherwise enclose other items and features of the fluid applicator. For example, the handle portion is configured to fit over portions of the valve pressure vessel and the fluid delivery line. The handle portion can include two handle portion halves, as indicated by block 550. The handle portion halves can be separately molded, hollowed-out halves, and can include various items and/or features. For example, each handle portion half can include, cavities configured to receive/house items of fluid applicator 110 and/or 610. Each handle portion half can further include coupling mechanisms configured to couple each half to the other, as well as alignment mechanisms configured to provide proper alignment of the halves together over the items and/or features of fluid applicator 110 and/or 610, as well as provide proper alignment of items and/or features within cavities of the hollowed-out handle portion. For instance, the handle portion halves can include interior alignment features that provide proper alignment of the fluid delivery line within the handle portion. The handle portion halves can include additional features, such as an integrated trigger guard, molded as a part of one or both handle portion halves, a pivotable trigger lock mounted to or otherwise an integral part of one or both handle portion halves, an integrated hook, molded as a part of one or both handle portion halves, various surface features and/or protrusions, as well as various other items and/or features, as indicated by block 552.

The handle portion can be coupled over the items and features of fluid applicator 110 and/or 610 in various ways. For example, the handle portion halves can be sonically welded together, as indicated by block 554. The handle portion halves can be fastened together, as indicated by block 556. For example, various fasteners (such as screws, bolts, etc.) can be used in combination with coupling features (e.g., 170) to fasten or otherwise couple the handle portion halves to each other and over the items and features of fluid applicator 110 and/or 610. The handle portion can be coupled in various other ways as well, as indicated by block 558.

Method 500 proceeds at block 512 where a trigger is provided. The trigger can include various items and/or features, including, but not limited to protrusions (such as a finger rest), mating features, wings, etc. The trigger can be pivotally mounted or coupled to the valve pressure vessel. For example, the trigger can be pivotally mounted to the valve actuation mechanism. The valve actuation mechanism can include mating features configured to mate with corresponding mating features of the trigger. In this way, the trigger can be "snapped-on" to the valve pressure vessel, as indicated by block 560. The trigger can be mounted or coupled to the valve pressure vessel in various other ways, as indicated by block 562.

It should be understood that the items and methods described in FIG. 16 can include the items and methods described elsewhere herein, including items and methods relative to fluid applicator 110 and/or 610.

Figure 17:
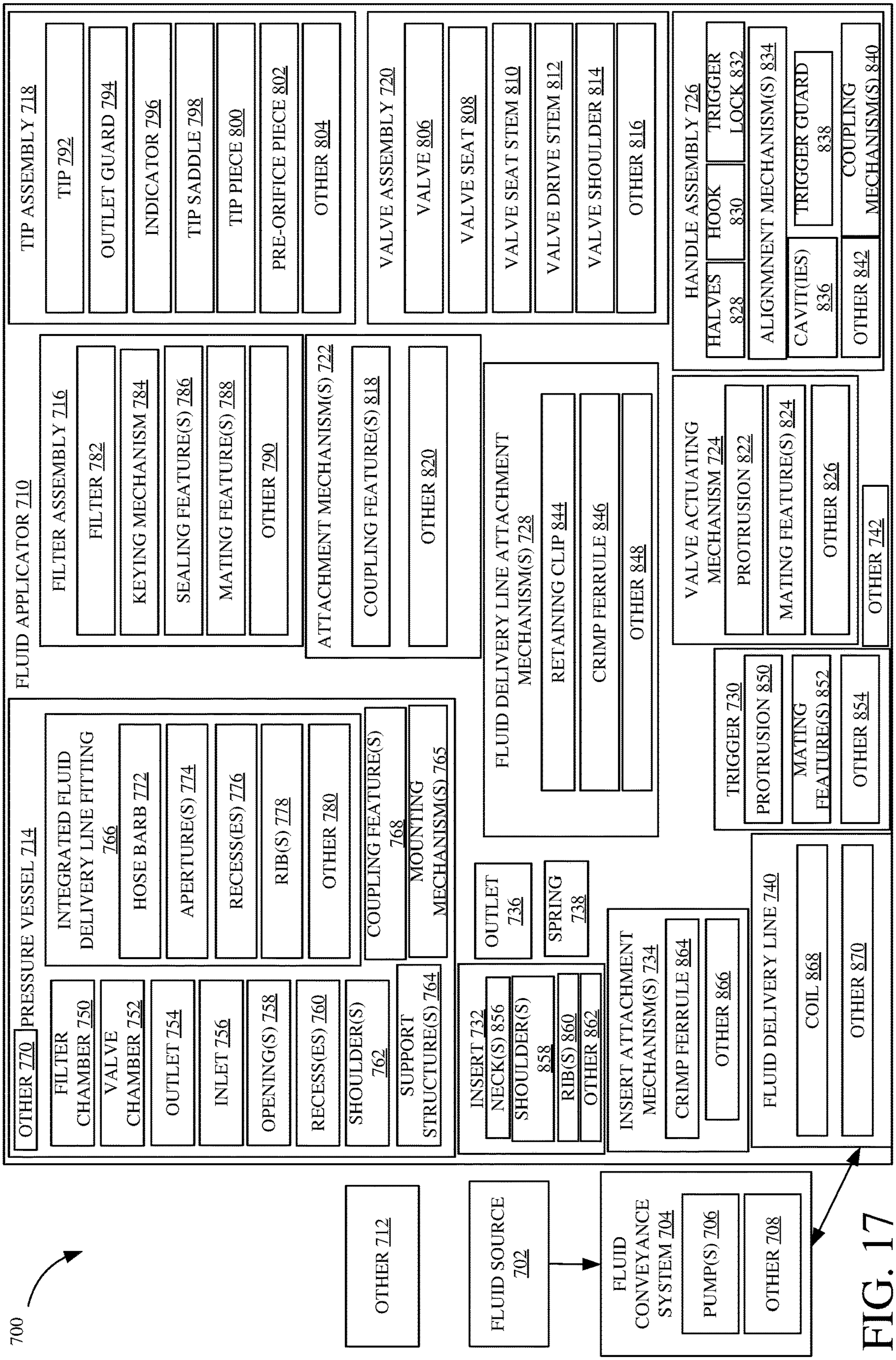
FIG. 17 is a block diagram showing one example fluid applicator system.

FIG. 17 is a simplified block diagram showing one example fluid applicator system 700. Fluid applicator system 700 includes fluid source 702, fluid conveyance system 704, fluid applicator 710, and can include other items 712 as well. Fluid source can include any number of sources of fluid, for instance various types of fluid containers. In some examples, fluid source 702 comprises a can or a bucket of fluid, for example, a coating fluid such as paint or stain. Fluid conveyance system 704 can include one or more pumps 706 (such as pump 102) as well as various other items 708. Fluid conveyance system conveys fluid from fluid source 702 to fluid applicator 710 via fluid delivery line 740. Fluid applicator 710 can be similar to other fluid applicators described herein, such as fluid applicators 110 or 610, or fluid applicator 710 can comprise a different fluid applicator. Fluid applicator 710 can include pressure vessel 714, filter assembly 716, tip assembly 718, valve assembly 720, one or more attachment mechanisms 722, valve actuating mechanism 724, handle assembly 726, one or more fluid delivery line attachment mechanisms, trigger 730, insert 732, one or more insert attachment mechanisms 734, outlet 736, spring 738, fluid delivery line 740, and can include other items 742 as well, including other items described herein.

Pressure vessel 714 can be pressure vessel 160 or can be another type of pressure vessel. Pressure vessel 714 can include filter chamber 750, valve chamber 752, outlet 754, inlet 756, one or more openings 758, one or more recesses 760, one or more shoulders 762, one or more support structures 764, integrated fluid delivery line fitting 766, coupling features 768, and can include various other items 770 as well. Integrated fluid delivery line fitting 766 itself can include hose barb 772, one or more apertures 774, one or more recesses 776, one or more ribs 778, and can include various other items 780, such as one or more retaining features, for example retaining feature 669.

Filter chamber 750 is configured to receive and house a filter assembly, such as filter assembly 716, within pressure vessel 714. Filter chamber 750 can be filter chamber 182 or can be another type of filter chamber. Valve chamber 752 is configured to receive and house a valve assembly, such as valve assembly 720, within pressure vessel 714. Valve chamber 752 can be valve chamber 184 or can be another type of valve chamber. Pressure vessel 714 can include an inlet 756 through which pressure vessel 714 receives fluid from fluid delivery line 740. Inlet 756 can be inlet 175 or can be another type of inlet. Pressure vessel 714 includes an outlet 754 through which fluid leaves the pressure vessel. Outlet 754 can be outlet 187 or can be another type of outlet. Pressure vessel can include one or more openings 758, such as an opening at the rear (or upstream end) of pressure vessel 714 through which various components of fluid applicator 710 can be installed into and removed from pressure vessel 714, such as valve assembly 720 and/or filter assembly 716.

Pressure vessel 714 can include one or more recesses 760 configured to receive various items of fluid applicator 710, such as tip saddle 798. Recesses 760 can include recess 189 or can be another type of recess. Pressure vessel 714 can include one or more shoulders 762 configured to retain various items within pressure vessel 714, such as valve seat 808. Shoulders 762 can include shoulders 177 or can be other types of shoulders. Pressure vessel 714 can include one or more support structures 764. Support structures 764 can be support structures 161 and/or 162 or can be other types of support structures. Pressure vessel 714 can include a mounting mechanism 765 configured to house and retain valve actuating mechanism 724. Mounting mechanism 765 can be to mounting mechanism 163 or can be another type of mounting mechanism. Pressure vessel 714 can include one or more coupling features 768 configured to provide coupling between pressure vessel 714 and one or more other items of fluid applicator 710, such as filter assembly 716 and/or attachment mechanisms 722. Coupling features 768 can include coupling features 188, 190, and/or 270, or can be different coupling features.

Integrated fluid delivery line fitting 766 can be fitting 158 or fitting 658, or can be another type of fluid delivery line fitting. Fluid delivery line fitting 766 can include a hose barb 772 (such as hose barb 158). Fitting 766 can include one or more apertures 766, such as an aperture on a side, such as the bottom side, of fitting 766 to allow one or more items of fluid applicator 710 therein, such as insert 732. Fitting 766 can include one or more recesses 776, such as recesses 690 and/or 691, as well as various other recesses. Fitting 766 can include one or more ribs 778 such as rib 174, barbs or ribs 173, as well as various other ribs or barbs. Fitting 766 can include various other items 780 as well.

Pressure vessel 714 can include various other items or features as well, as indicated by 770, for example, but not limited to, various geometries, various dimensions, such as internal diameters, external diameters, and/or wall thicknesses, as well as various other items and features.

Filter assembly 716 is configured to be received in filter chamber 750 of pressure vessel 714, for example, installed in an opening 758 on the rear or upstream end of pressure vessel 714. Filter assembly 716 is configured to receive fluid and filter the fluid, such as to remove unwanted contaminants from the fluid. Filter assembly 716 can include a filter 782, such as filter 148, or another type of filter. Filter assembly 716 can include a keying mechanism 784, such as keying mechanism 153, or another type of keying mechanism. Filter assembly 716 can include one or more sealing features 786, such as sealing feature 206, or another type of sealing feature. Filter assembly 716 can including one or more mating features, such as mating features 206, or another type of mating feature. Filter assembly 716 can include various other items 790.

Tip assembly 718 is configured to be coupled to or disposed at a front or downstream end of fluid applicator 210. Tip assembly 718 can include a tip 792, such as tip 129 or tip 630, or another type of tip. Tip 792 can include a tip body, such as tip body 209 or another type of type body as well as a flag, such as flag 130 or another type of flag. Tip assembly 718 can include an outlet guard 794, such as outlet guard 132, or another type of outlet guard. Tip assembly 718 can include an indicator 796, such as indicator 131, or another type of indicator. Tip assembly 718 can include a tip saddle 798, such as tip saddle 215 or tip saddle 315, or another type of tip saddle. Tip assembly 718 can include a tip piece 800, such as tip piece 210, or another type of tip piece. Tip assembly 718 can include a pre-orifice piece 802, such as pre-orifice piece 212, or another type of pre-orifice piece. Tip assembly 718 can include various other items 804 as well, for example, but not limited to, one or more turbulence chambers, inlets, outlets, internal diameters, geometries, etc.

Valve assembly 720 is actuatable, such as by actuation of trigger 730 and/or valve actuating mechanism 724, to control a flow of fluid through fluid applicator 710, such as through pressure vessel 714. In one example, valve assembly 720 is configured to be received in valve chamber 752 of pressure vessel 714, for example, installed in an opening 758 on the rear or upstream end of pressure vessel 714. Valve assembly 720 can include a valve 806, such as valve 200, or another type of valve. Valve assembly 720 can include a valve seat 808, such as valve seat 186, or another type of valve seat. Valve assembly 720 can include a valve seat stem 810, such as valve seat stem 202, or another type of valve seat stem. Valve assembly 720 can include valve drive stem 812, such as valve drive stem 201, or another type of valve stem. Valve assembly 720 can include a valve shoulder 814, such as valve shoulder 204, or another type of valve shoulder. Valve assembly 720 can include various other items 816.

Fluid applicator 710 can include one or more attachment mechanisms 722, such as attachment mechanism 136, configured to attach or couple one or more components to fluid applicator 710, such as coupling tip assembly 718 to pressure vessel 714. Attachment mechanisms 722 can include one or more coupling features 818, such as coupling feature 207, or another type of coupling feature. Attachment mechanisms 722 can include various other items 820 as well.

Valve actuating mechanism 724 is configured to actuate valve assembly 720. Valve actuating mechanism 724 can be valve actuating mechanism 180 or can be another type of valve actuating mechanism. In one example, valve actuating mechanism is disposed and rotatable within mounting mechanism 765 on pressure vessel 714. Valve actuating mechanism 724 can include a protrusion 822, such as protrusion 181, or another type of protrusion. Valve actuating mechanism 724 can include one or more mating features 824, such as mating features 254, or other types of mating features. Valve actuating mechanism 724 can include other items 826 as well.

Handle assembly 726 is configured to house or receive (or otherwise be disposed over) various other items of fluid applicator 710, such as pressure vessel 714 and/or fluid delivery line 740. Handle assembly 726 can include handle halves 828, such as handle halves 172, or other types of handle halves. Handle assembly 276 can include a hook 830, such as hook 150, or another type of hook. Handle assembly 726 can include a trigger lock 832, such as trigger lock 141, or another type of trigger lock. Handle assembly 726 can include one or more alignment mechanisms 834, such as alignment mechanisms 171, or other types of alignment mechanisms. Handle assembly 726 can include one or more cavities 836, such as cavities 164, 166, and/or 168, or other types of cavities. Handle assembly 726 can include a trigger guard 838, such as trigger guard 140, or another type of trigger guard. Handle assembly 726 can include one or more coupling mechanisms, such as coupling mechanisms 170, or other types of coupling mechanisms. Handle assembly 726 can include various other items 842 as well, such as one or more protrusions, such as protrusion 146, and/or one or more surface features, such as surface features 145.

Fluid applicator 710 can include one or more fluid delivery line attachment mechanisms 728 configured to couple fluid delivery 740 to integrated fluid delivery line fitting 766. Fluid delivery line attachment mechanisms 728 can include a retaining clip, such as retaining clip 257, or another type of retaining clip. Fluid delivery line attachment mechanisms 728 can include a crimp ferrule 846, such as crimp ferrule 156, or another type of crimp ferrule. Fluid delivery line attachment mechanisms 728 can include various other items 848 suitable for coupling fluid delivery line 740 to integrated fluid delivery line fitting 766.

Fluid applicator 710 can include a trigger 730, such as trigger 138, or another type of trigger. Trigger 730 can include a protrusion 850, such as protrusion 137, or another type of protrusion. Trigger 730 can include one or more mating features 852, such as mating features 256. In one example, trigger 730 is coupled to valve actuating mechanism 724, via mating features 824 and 852, such that actuation of trigger 730 actuates valve actuating mechanism 724. Trigger 730 can include various other items 854, for example, wings 258.

Fluid applicator 710 can include an insert 732, such as insert 667, or another type of insert, configured to be coupled to and disposed within fluid delivery line 740 and coupled to and disposed within integrated fluid delivery line fitting 766. Insert 732 can include one or more necks 856, such as neck 674, or other types of necks. Insert 667 can include one or more shoulders 858, such as shoulders 675 and/or 677, or other types of shoulders. Insert 667 can include one or more ribs 860, such as rib 684, or other types of ribs. Insert 732 can include various other items 732 as well, for example, an inlet, such as inlet 681, and/or an outlet, such as outlet 679.

Fluid applicator 710 can include one or more insert attachment mechanisms 734, configured to attach or couple insert 732 to fluid delivery line 740. Insert attachment mechanisms 734 can include a crimp ferrule 864, such as crimp ferrule 656, or another type of crimp ferrule. Insert attachment mechanisms 734 can include various other items 866 as well.

Fluid applicator 710 can include an outlet 736, such as outlet 134, or another type of outlet. Fluid applicator 710 can include a spring 738, such as spring 203, or another type of spring. Fluid applicator 710 can include a fluid delivery line 740, such as fluid delivery line 106, or another type of fluid delivery line. Fluid delivery line 740 can include a coil 868, such as coil 154, or another type of coil. Fluid delivery line 740 can include various other items 870 as well.

Fluid applicator 710 can include various other items and/or features, as indicated by 742.

At least some examples are described herein in the context of applying a coating material, such as paint, to a surface. As used herein, paint includes substances composed of coloring matter or pigment suspending in a liquid medium as well as substances that are free of coloring matter or pigment. Paint can also include preparatory coatings, such as primers. Paint can be applied to coat a surface as a liquid or a gaseous suspension, for example, and the coating provided can be opaque, transparent, or semi-transparent. Some particular examples include, but are not limited to, latex paint, oil-based paint, stain, lacquers, varnish, inks, and the like. At least some examples can be applied in plural components systems.

Additionally, while a particular order of steps have been described for the sake of illustration, it is to be understood that some or all of these steps can be performed in any number of orders.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts mentioned above are disclosed as example forms of implementing the claims.

What is claimed is:

1. A fluid applicator comprising:

a pressure vessel configured to receive pressurized fluid from a fluid delivery line, the pressure vessel comprising:
- a valve chamber;
- a valve disposed within the valve chamber;
- a mounting mechanism;
- a filter chamber;
- a filter disposed within the filter chamber; and
- a fluid delivery line fitting configured to be coupled to the fluid delivery line;

a valve actuating mechanism disposed within the mounting mechanism and moveable to actuate the valve, the valve actuating mechanism comprising:
- a first mating feature; and
- a second mating feature; and a tip assembly coupled to the pressure vessel and configured to atomize the pressurized fluid.

2. The fluid applicator of claim 1 and further comprising:

a trigger coupled to the valve actuating mechanism, the trigger comprising:
- a third mating feature mated with the first mating feature of the valve actuating mechanism; and
- a fourth mating feature mated with the second mating feature of the valve actuating mechanism, wherein the trigger is actuatable to move the valve actuating mechanism.

3. The fluid applicator of claim 2, wherein the trigger has, at a first position, a first width between the third mating feature and the fourth mating feature of the trigger, the first width being less than a width between the first mating feature and the second mating feature of the valve actuating mechanism; and wherein the trigger is actuatable to a second position at which the trigger has a second width between the third mating feature and the fourth mating feature of the trigger, the second width being more than the width between the first mating feature and the second mating feature of the valve actuating mechanism.

4. The fluid applicator of claim 1, wherein the tip assembly comprises:

a ball tip saddle comprising a first aperture and a second aperture, the second aperture comprising an inlet and an outlet; and a tip stem comprising an aperture extending between an inlet and an outlet, the tip stem disposed through the first aperture of the ball tip saddle.

5. The fluid applicator of claim 4, wherein the tip assembly further comprises:

a tip piece disposed within the aperture of the tip stem and between the inlet and the outlet of the second aperture of the ball tip saddle; and a pre-orifice piece disposed within the aperture of the tip stem, upstream of the tip piece and between the inlet and the outlet of the second aperture of the ball tip saddle.

6. The fluid applicator of claim 4 and further comprising:

a guard comprising a slot and a recess, wherein the tip stem is disposed within the slot of the guard and wherein the ball tip saddle is disposed within the recess of the guard.

7. The fluid applicator of claim 6 and further comprising:

an attachment mechanism coupled to the pressure vessel, the attachment mechanism comprising:
- an aperture, wherein the ball tip saddle is disposed within the aperture of the attachment mechanism; and
- a coupling feature coupling the attachment mechanism to the guard.

8. The fluid applicator of claim 7, wherein the pressure vessel comprises a coupling feature disposed within the aperture of the attachment mechanism and couples the attachment mechanism to the pressure vessel.

9. The fluid applicator of claim 4, wherein the pressure vessel further comprises:

an outlet comprising a recess, wherein the ball tip saddle is disposed within and contacts the recess of the outlet of the pressure vessel to form a seal.

10. The fluid applicator of claim 1, wherein the tip assembly comprises:

a tip saddle comprising:
- a first aperture;
- a second aperture; and
- a tapered upstream end; and a tip stem disposed through the first aperture of the tip saddle.

11. The fluid applicator of claim 10, wherein the tip assembly further comprises:

a tip piece disposed within the second aperture of the tip saddle; and a pre-orifice piece disposed within the second aperture, upstream of the tip piece.

12. The fluid applicator of claim 10, wherein the pressure vessel further comprises:

an outlet comprising a tapered recess; and wherein the tapered upstream end of the tip saddle is disposed within and contacts the tapered recess of the outlet of the pressure vessel to form a seal.

13. The fluid applicator of claim 10 and further comprising:

a guard comprising:
- a first aperture; and
- a second aperture, wherein the tip stem is disposed within the first aperture of the guard and wherein the tip saddle is disposed within the second aperture of the guard.

14. The fluid applicator of claim 13 and further comprising;

an attachment mechanism coupled to the guard and comprising:
- an aperture; and
- a coupling feature within the aperture of the attachment mechanism.

15. The fluid applicator of claim 14, wherein the pressure vessel is disposed within the aperture of the attachment mechanism and comprises a coupling feature that mates with the coupling feature of the attachment mechanism.

16. The fluid applicator of claim 1 and further comprising a valve seat insert molded into the pressure vessel.

17. The fluid applicator of claim 16, wherein the valve seat insert is a carbide valve seat insert.

18. The fluid applicator of claim 16, wherein the valve seat insert is a ceramic valve seat insert.

19. The fluid applicator of claim 1, wherein the tip assembly is coupled to a first end of the pressure vessel and wherein the pressure vessel includes an opening on a second end of the pressure vessel, opposite the first end, through which the valve travels to be disposed in the valve chamber.

20. A fluid applicator comprising:
- a pressure vessel configured to receive pressurized fluid from a fluid delivery line, the pressure vessel comprising:
  - a valve chamber;
  - a valve disposed within the valve chamber;
  - a valve seat insert molded into the pressure vessel;
  - a filter chamber;
  - a filter disposed within the filter chamber; and
  - a fluid delivery line fitting configured to be coupled to the fluid delivery line; and
- a tip assembly coupled to the pressure vessel and configured to atomize the pressurized fluid.

21. A fluid applicator comprising:
- a pressure vessel configured to receive pressurized fluid from a fluid delivery line, the pressure vessel comprising:
  - a first end;
  - a second end opposite the first end;
  - an opening on the second end;
  - a valve chamber;
  - a valve disposed within the valve chamber, the valve configured to travel through the opening on the second end to be disposed within the valve chamber;
  - a filter chamber;
  - a filter disposed within the filter chamber; and
  - a fluid delivery line fitting configured to be coupled to the fluid delivery line; and
- a tip assembly coupled to the first end of the pressure vessel and configured to atomize the pressurized fluid.

22. A fluid applicator comprising:
- a pressure vessel configured to receive pressurized fluid from a fluid delivery line, the pressure vessel comprising:
  - a valve chamber;
  - a valve disposed within the valve chamber;
  - a filter chamber;
  - a filter disposed within the filter chamber; and
  - a fluid delivery line fitting configured to be coupled to the fluid delivery line; and
- a tip assembly coupled to the pressure vessel and configured to atomize the pressurized fluid, the tip assembly comprising:
  - a ball tip saddle comprising a first aperture and a second aperture, the second aperture comprising an inlet and an outlet; and
  - a tip stem comprising a third aperture extending between an inlet and an outlet, the tip stem disposed through the first aperture of the ball tip saddle.

23. A fluid applicator comprising:
- a pressure vessel configured to receive pressurized fluid from a fluid delivery line, the pressure vessel comprising:
  - a valve chamber;
  - a valve disposed within the valve chamber;
  - a filter chamber;
  - a filter disposed within the filter chamber; and
  - a fluid delivery line fitting configured to be coupled to the fluid delivery line; and
- a tip assembly coupled to the pressure vessel and configured to atomize the pressurized fluid; the tip assembly comprising:
  - a tip saddle comprising:
    - a first aperture;
    - a second aperture; and
    - a tapered upstream end; and
- a tip stem disposed through the first aperture of the tip saddle.

* * * * *